(12) United States Patent
Popov et al.

(10) Patent No.: US 12,546,853 B2
(45) Date of Patent: Feb. 10, 2026

(54) SYSTEMS AND METHODS FOR SHAPING BEAMS PRODUCED BY ANTENNA ARRAYS

(71) Applicant: VAYYAR IMAGING LTD., Yehud (IL)

(72) Inventors: Mark Popov, Ramat Gan (IL); Tom Harel, Shefayim (IL); Yuval Lomnitz, Herzeliya (IL); Ilan Hayat, Givat Ada (IL); Naftali Chayat, Kfar Saba (IL); Damian Hoffman, Ramat Gan (IL); Orel Ron, Rishon Letsiyon (IL)

( * ) Notice: Subject to any disclaimer, the term of this patent is extended or adjusted under 35 U.S.C. 154(b) by 183 days.

(21) Appl. No.: 18/135,159

(22) Filed: Apr. 16, 2023

(65) Prior Publication Data
US 2023/0251347 A1 Aug. 10, 2023

Related U.S. Application Data

(63) Continuation of application No. 17/625,784, filed as application No. PCT/IB2020/062591 on Dec. 31, 2020, now Pat. No. 11,630,184.
(Continued)

(51) Int. Cl.
*G01S 7/03* (2006.01)
*G01S 7/35* (2006.01)
*G01S 13/89* (2006.01)

(52) U.S. Cl.
CPC .................. *G01S 7/03* (2013.01); *G01S 7/35* (2013.01); *G01S 13/89* (2013.01)

(58) Field of Classification Search
CPC ............. H04L 27/2621; H04L 27/2614; H04L 27/2618; H04L 27/26132; H04L 27/2634; H04L 27/2636; H04L 27/2626; H04L 27/263; H04L 27/18; H04B 7/0413; H04B 7/0465; H04B 7/0452; H04B 7/0617; H04B 7/18543; H04B 7/2041; H04J 11/00;
(Continued)

(56) References Cited

U.S. PATENT DOCUMENTS

| 9,869,762 B1 * | 1/2018 | Alland | ................... H01Q 21/08 |
| 2002/0086708 A1 * | 7/2002 | Teo | ..................... H04L 27/2626 |
| | | | 455/525 |

(Continued)

FOREIGN PATENT DOCUMENTS

| GB | 2458324 A | * | 9/2009 | ............ H04W 16/28 |
| KR | 20180091696 A | * | 8/2018 | ......... H04L 27/2621 |

OTHER PUBLICATIONS

R. Firat Tigrek and P. van Genderen, "A Golay code based approach to reduction of the PAPR and its consequence for the data throughput," 2007 European Radar Conference, Munich, Germany, 2007, pp. 146-149, doi: 10.1109/EURAD.2007.4404958. (Year: 2007).*

*Primary Examiner* — Olumide Ajibade Akonai
(74) *Attorney, Agent, or Firm* — AlphaPatent Associates Ltd.; Daniel J. Swirsky

(57) ABSTRACT

Antenna array systems and methods for generating an antenna array transmission pattern having a spatial directional distribution of effective power characterized by a low Peak to Average Power Ratio (PAPR). An excitation phase sequence is generated having elements corresponding antenna elements of the array and having a Fourier Transform with a low PAPR. An excitation phase is assigned to each antenna element according to the corresponding element of the excitation phase sequence.

20 Claims, 16 Drawing Sheets

Related U.S. Application Data

(60) Provisional application No. 63/072,316, filed on Aug. 31, 2020, provisional application No. 63/011,374, filed on Apr. 17, 2020, provisional application No. 62/955,487, filed on Dec. 31, 2019.

(58) Field of Classification Search
CPC ............ H04J 13/004; G01S 2013/0245; G01S 13/343; G01S 7/03; G01S 7/35; G01S 13/931; H04W 84/06
See application file for complete search history.

(56) References Cited

U.S. PATENT DOCUMENTS

| | | | |
|---|---|---|---|
| 2016/0182136 A1* | 6/2016 | Zhang | H04J 11/0033 370/329 |
| 2017/0126454 A1* | 5/2017 | Huan | H04L 27/263 |
| 2017/0134202 A1* | 5/2017 | Baligh | H04L 27/2614 |
| 2018/0084581 A1* | 3/2018 | Terry | H04L 5/006 |
| 2018/0166794 A1* | 6/2018 | Raphaeli | G01S 13/42 |
| 2018/0212810 A1* | 7/2018 | Park | H04L 27/2621 |
| 2019/0052500 A1* | 2/2019 | Choi | H04B 1/707 |
| 2020/0204313 A1* | 6/2020 | Choi | H04L 5/0048 |
| 2021/0226834 A1* | 7/2021 | Shattil | H04L 27/2621 |

\* cited by examiner (i)  (ii)

(iii)  (iv)

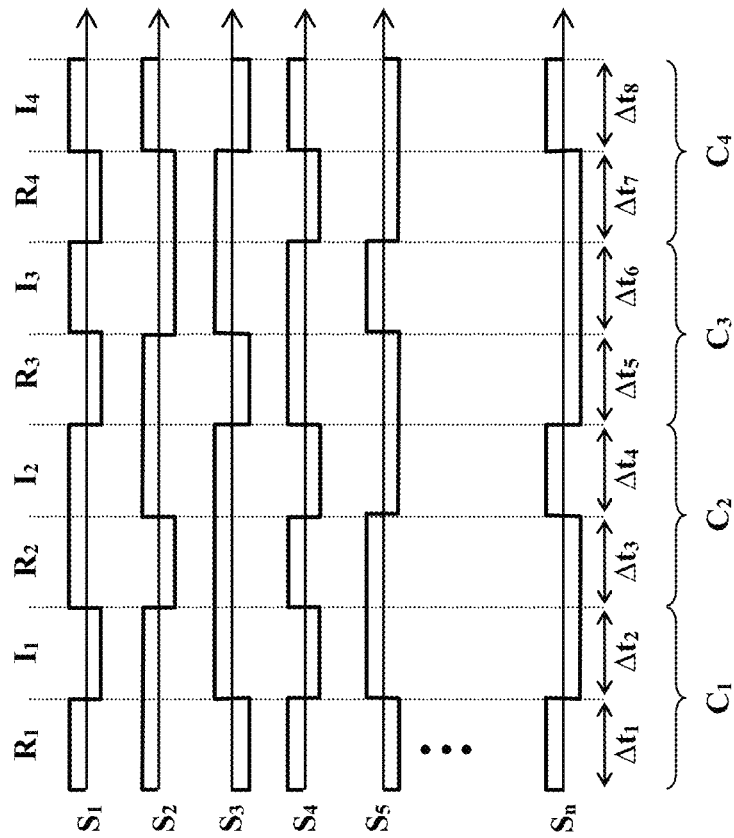
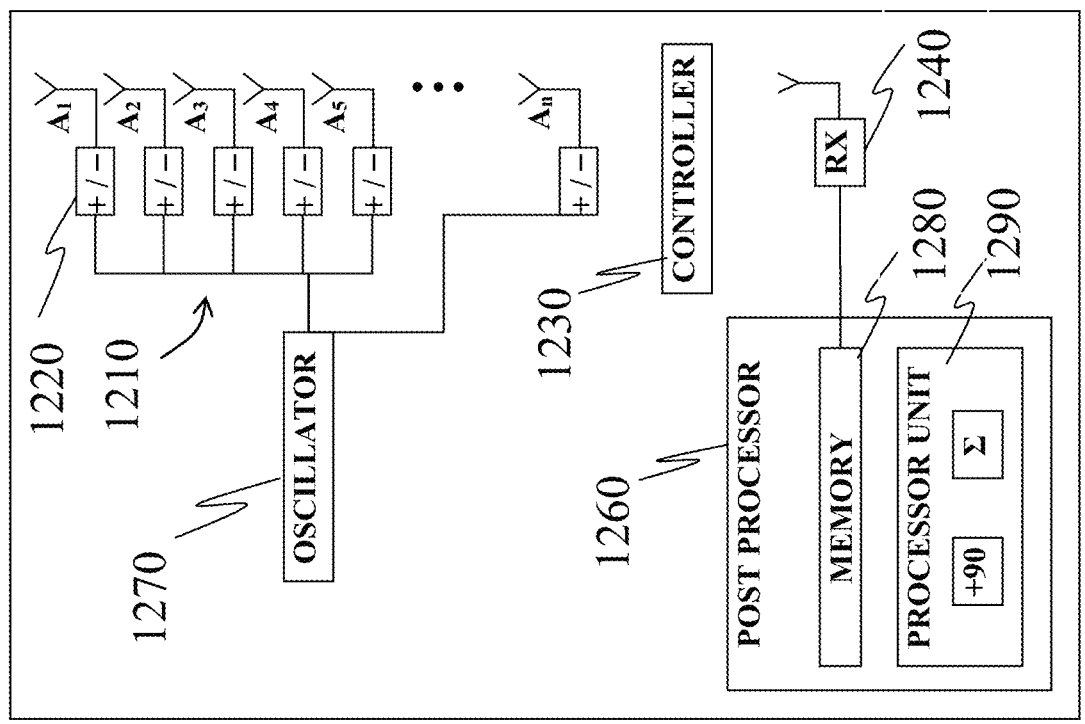
Fig. 2B
Fig. 2A

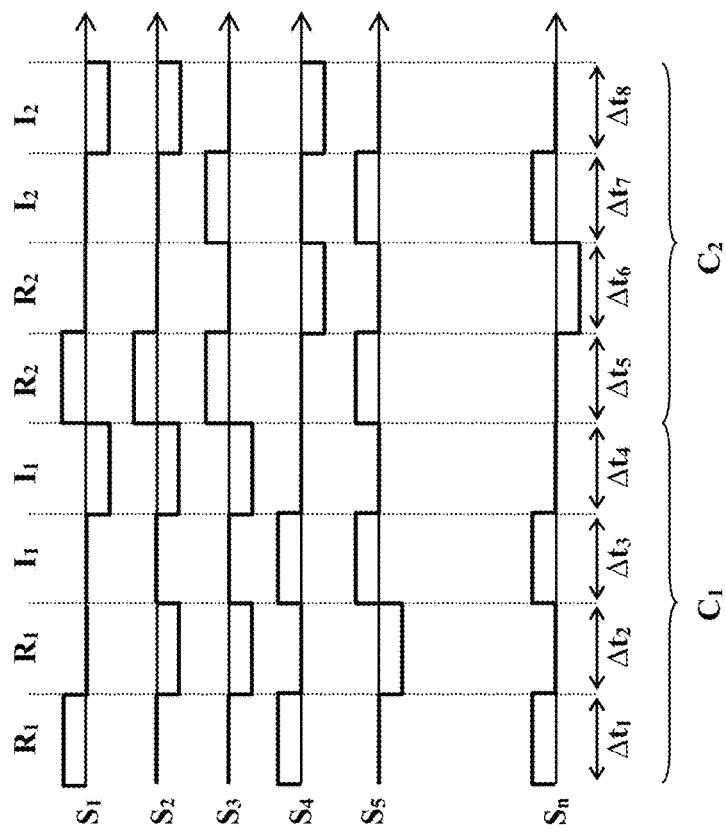
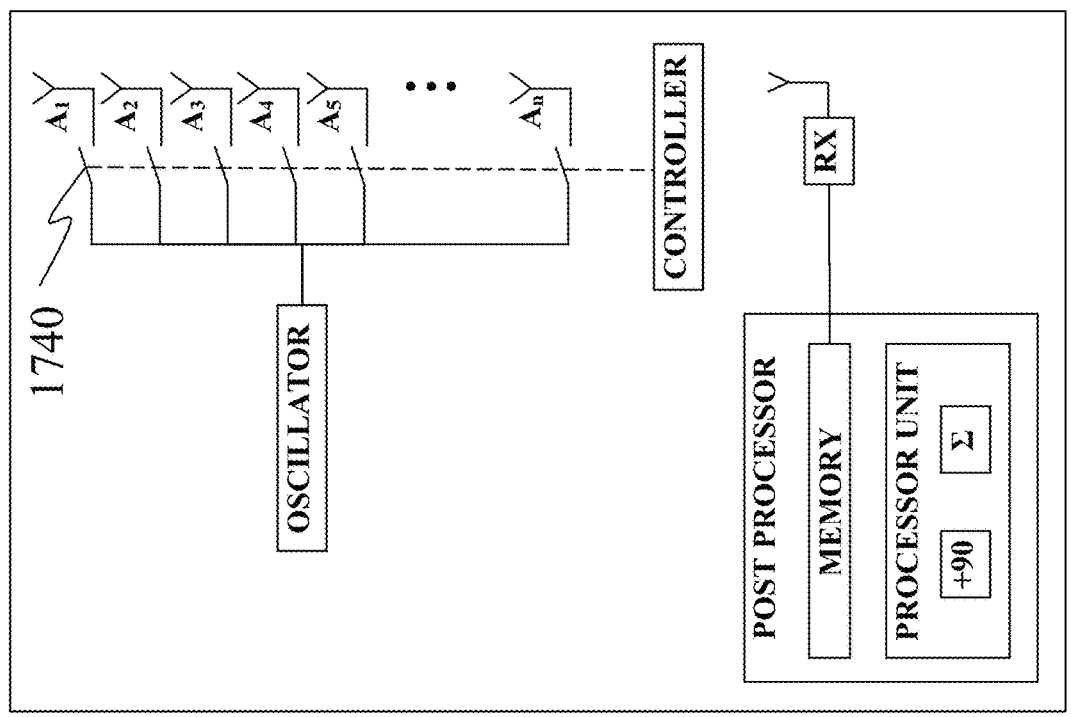
Fig. 4B
Fig. 4A

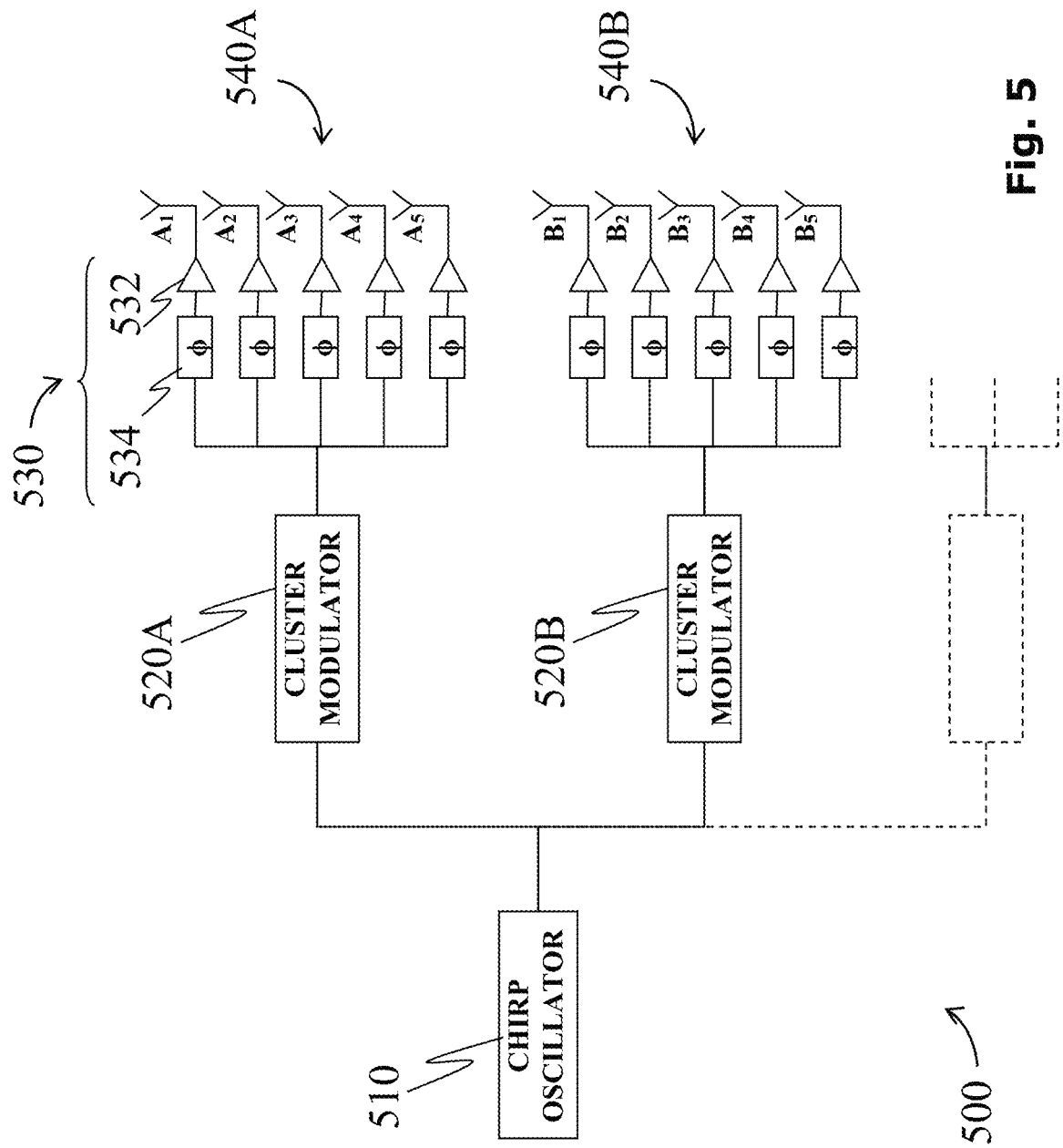

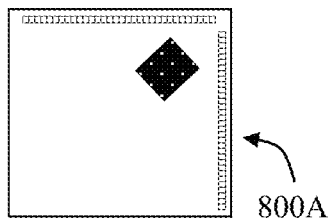
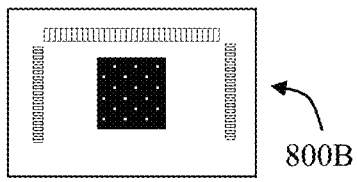
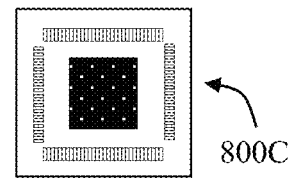
Fig. 8A  Fig. 8B  Fig. 8C
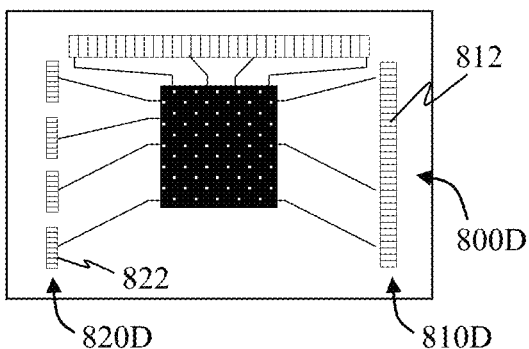
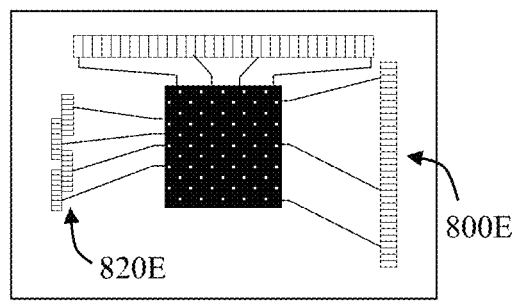
Fig. 8D  Fig. 8E
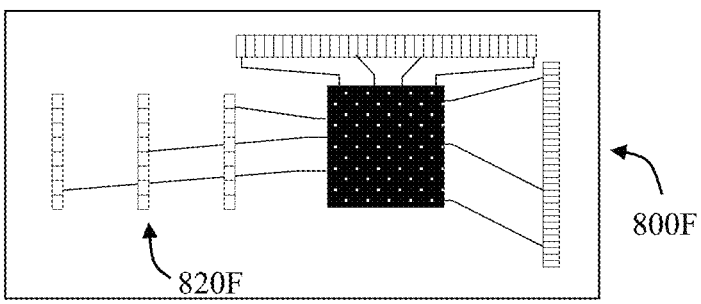
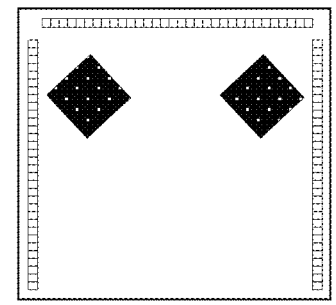
Fig. 8F  Fig. 8H
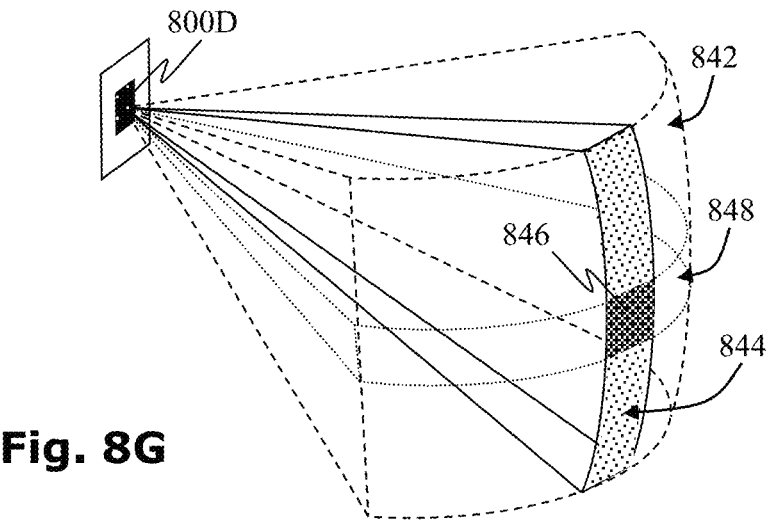
Fig. 8G

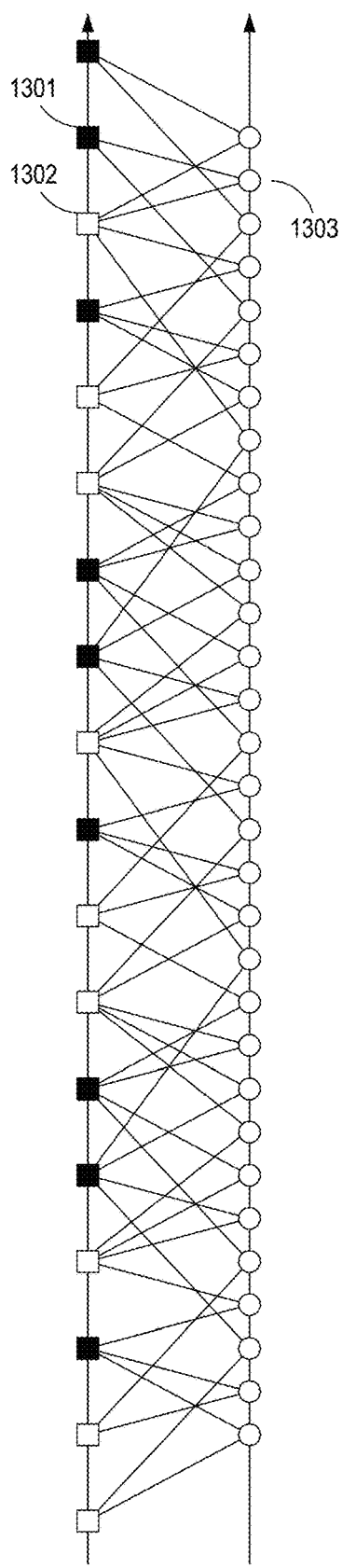
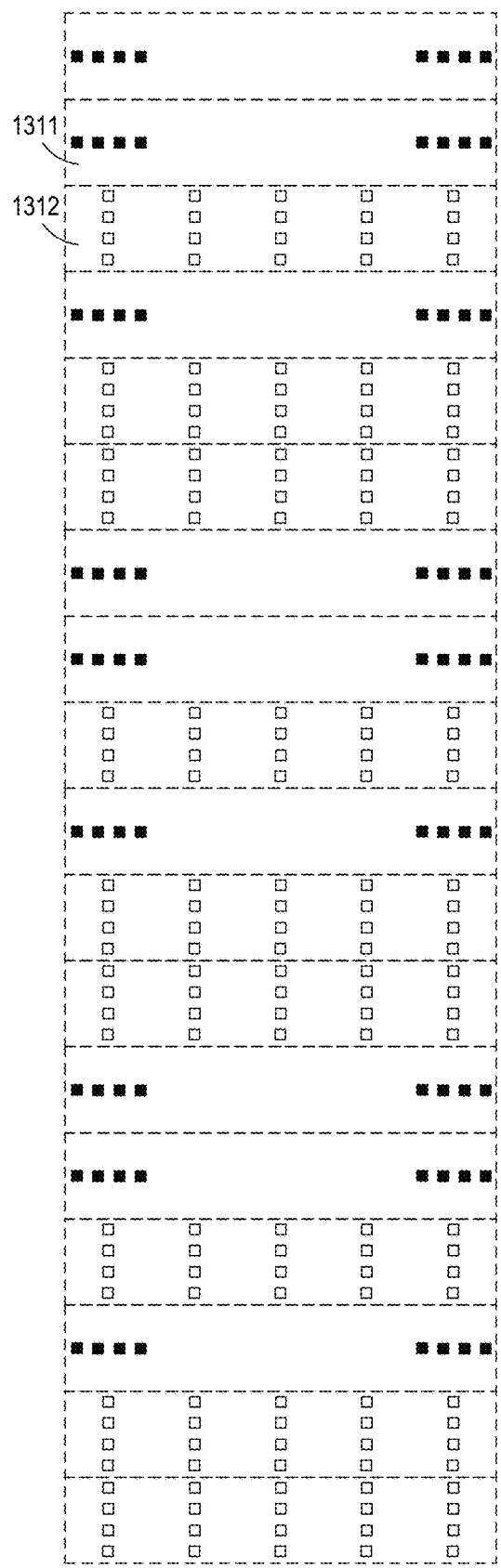
FIG. 13A
FIG. 13B

SYSTEMS AND METHODS FOR SHAPING BEAMS PRODUCED BY ANTENNA ARRAYS

CROSS-REFERENCE TO RELATED APPLICATIONS

This application is a continuation application of U.S. patent application Ser. No. 17/625,784, which was filed Jan. 10, 2022 as a U.S. National Phase Application under 35 U.S.C. 371 of International Application No. PCT/IB2020/062591, which has an international filing date of Dec. 31, 2020, which claims the benefit of priority from U.S. Provisional Patent Application No. 62/955,487, filed Dec. 31, 2019, U.S. Provisional Patent Application No. 63/037,021, filed Jun. 10, 2020, and U.S. Provisional Patent Application No. 63/072,316, filed Aug. 31, 2020, the contents of which are incorporated by reference in their entirety.

FIELD OF THE DISCLOSURE

The disclosure herein relates to systems and methods for shaping the beam produced by antenna arrays. In particular, the disclosure relates to applying post processing to binary phase shifted signals to simulate multiple-phase-shift keying (MPSK) based beam forming such as quadrature phase-shift keying (QPSK) beam forming for example. Optimized antenna array designs for MIMO radar based imaging are disclosed.

BACKGROUND

The application of radar is becoming more and more popular with the development of the RFIC and signal technology. Radar sensors have the advantage of operating in total darkness, fog, mist and rain. Radar is an electronic system with the advantages of low cost, low-power consumption, and high precision. It can be significantly applied in various applications including, space shuttle topographic missions, optics, geotechnical mapping, meteorological detection, and so on. The working efficiency of a radar system is based upon reliable and stable radar signal with wide coverage, high directionality, high gain and low signal-to-noise ratio.

The directionality achievable by antenna depends on its physical size, relative to the wavelength at the frequency of operation. This is true for both mechanically steered and electronically steered beams. Electronic beam steering involves aligning the phases of signals from/to antenna elements in a given direction. The beam shape of an antenna array depends upon the phase shift applied to each antenna element in the array. Typically each antenna element has an a-priori implementation dependent phase shift related to the transmission lines and amplifiers along the signal path to the antenna element. Where no additional phase shift is applied, the resulting beam typically has no well-defined beam shape, such that the direction from which reflected beams are received is difficult to determine.

A well-known method of achieving highly directional beams is applying phase shift along each path to the corresponding antenna elements, so that the transmissions from different elements combine coherently in a given propagation direction. However, applying arbitrary phase shift incurs implementation complexity, and sometimes there's a need to resort to coarse phase control. Examples of coarse phase control are selecting one of 2 or 4 possible phases, while finer control may allow selecting on of 8 or 16 phase values in each phase-controlled path.

Directionality to a transmitted beam may be achieved through binary phase shift keying (BPSK) based beam forming. This may be achieved by applying a 0-or-180 degree phase shift to the signal transmitted via selected antennas. However, BPSK beamforming carrier a penalty due to the coarse phase quantization and large difference, on the average, between the optimal desired and the actual phase. BPSK beam forming generates, on the average, significant side lobes which may dissipate about 60% of the energy of the transmission. Reduction of sidelobes calls for finer-grain control of the phase, e.g. every 90 degrees rather than 180 degrees. With 90 degree granularity of phase control, only 20% of energy is lost to sidelobes.

By way of example, in the context of imaging, the transmit antennas may be scanned by various code-sequences over several time intervals (for example, switching between antennas over time, or coding the antennas by a Hadamard code, or beamforming toward specific directions). The directional characteristics can be reconstructed by a-posteriori beamforming, combined with inversion of the encoding matrix. Reflection from a moving target may produce phase rotation over those time intervals in a manner detrimental to imaging. The motivation to generate good beamformers arrives from the fact that concentrating energy to a different direction in each time interval reduces the effect of phase rotation. Furthermore, where transmission sweep over a range of frequencies is transmitted over a time period, such as an up-chirp or a down-chirp, the delay between time intervals is increased still further.

As a result it can be very difficult to accurately determine the location of a target.

The need remains, therefore, for effective radar sensors which may be used to accurately sense objects in the region surrounding a travelling vehicle. The invention described herein addresses the above-described needs.

SUMMARY OF THE EMBODIMENTS

According to one aspect of the presently disclosed subject matter, a system is introduced for shaping the beam produced by antenna arrays, for example by reducing side lobes. Various systems may include at least one binary phase shifter. Such as phase shifter may be configured and operable to selectively apply a phase shift of 180 degrees to a transmitted signal. A controller may be configured to send instructions to the at least one binary phase shifter. The system may also include at least one receiving antenna; and a post processor comprising a memory operable to save received signals; and a processing unit operable to apply a 90 degree phase shift to selected received signals stored in the memory, and further operable to sum received signals stored in the memory.

In still another aspect a method is taught for simulating quadrature phase-shift key (QPSK) beam forming in an antenna array, wherein each antenna of the array is connected to a common transmitter via a binary phase shifter. The method may include determining a required complex QPSK steering vector for each transmitting antenna of the array. The steering vector typically has a real component selected from 0 and 180 degrees and an imaginary component selected from 90 and 270 degrees.

Accordingly, the transmitter generates an oscillating signal. During a first time interval, for each transmitting antenna having an associated steering vector with a real component of 180 degrees, said binary phase shifter a 180 degree phase shift to the transmitted signal is applied. During a second time interval, for each transmitting antenna having an associated steering vector with an imaginary component of 180 degrees, said binary phase shifter a 180 degree phase shift to the transmitted signal is applied. A post processor may be used to apply a 90 degree phase shift to signals received during the second time interval, and the post processor may sum the signals received during the first time interval to 90 degree phase shifted signals received during the second time interval. Optionally the transmitter may sweep the oscillating signal over a range of frequencies during each time interval.

Accordingly, according to various examples, a controller may provide a system for simulating quadrature phase-shift key (QPSK) beam forming in an antenna array, the system comprising a transmitter, an antenna. The controller may be operable to: determine a required complex steering vector for each antenna of the array, the complex steering vector comprising a real component selected from 0 and 180 degrees and an imaginary component selected from 90 and 270 degrees; during a first time interval, instruct the binary phase shifters to apply a 180 degree phase shift to the transmitted signal for each antenna having an associated steering vector with a real component of 180 degrees; and during a second time interval, instruct the binary phase shifters to apply a 180 degree phase shift to the transmitted signal for each antenna having an associated steering vector with an imaginary component of 180 degrees; and wherein said post processor is operable to apply a 90 degree phase shift to signals received during the second time interval; and sum the signals received during the first time interval to 90 degree phase shifted signals received during the second time interval.

Optionally, a dedicated binary phase shifter is provided for each transmitting antenna of the array. Additionally or alternatively, an independently controlled switch connects each transmission antenna to the oscillator.

Where appropriate, a gain control unit may be associated with each transmitting antenna, and the controller is further configured to send instructions to the gain control units. Accordingly, for each transmitting antenna, the controller may be operable to select a required amplitude AR for the real component of the associated steering vector; during a first time interval instruct the associated gain control unit to apply a first gain GR to the transmitted signal; select a required amplitude AI for the imaginary component of the associated steering vector; and during a second time interval instruct the associated gain control unit to apply a second gain GI to the transmitted signal wherein the second gain GI is equal to the product of GR and the ratio of AI to AR. Variously, each antenna may have a dedicated binary phase shifter, or a common binary phase shifter may be connected to multiple antennas.

In still another aspect a method is taught for simulating quadrature phase-shift key (QPSK) beam forming in an antenna array, wherein each antenna of the array is connected to a common transmitter via a binary phase shifter. The method may include determining a required complex QPSK steering vector for each transmitting antenna of the array. The steering vector typically has a real component selected from 0 and 180 degrees and an imaginary component selected from 90 and 270 degrees.

Accordingly, the transmitter generates an oscillating signal. During a first time interval, for each transmitting antenna having an associated steering vector with a real component of 180 degrees, said binary phase shifter a 180 degree phase shift to the transmitted signal is applied. During a second time interval, for each transmitting antenna having an associated steering vector with an imaginary component of 180 degrees, said binary phase shifter a 180 degree phase shift to the transmitted signal is applied. A post processor may be used to apply a 90 degree phase shift to signals received during the second time interval, and the post processor may sum the signals received during the first time interval to 90 degree phase shifted signals received during the second time interval. Optionally the transmitter may sweep the oscillating signal over a range of frequencies during each time interval.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 10 illustrates how a steering vector may be generated by QPSK phase shifting of the phase of selected antennas by 0, 90, 180 or 270 degrees;

FIG. 2A is a block diagram schematically representing selected elements of a first embodiment of a system for simulating quadrature phase-shift keying (QPSK) beam forming;

FIG. 2B are a set of graphs indicating a possible set of profiles showing an example of how the phase of the transmitted signal from each transmitter antenna of the first embodiment may change over time;

FIG. 4A is block diagram of a system including a common binary phase shifted shared by all antennas according to a third embodiment;

FIG. 4B are set of graphs indicating a possible set of profiles showing an example of how the phase of the transmitted signal from each transmitter antenna of the third embodiment may change over time;

FIG. 5 is a block diagram of a system including clustered transmitter antennas connected to a common oscillator via dedicated cluster modulators;

FIG. 8A-C illustrate various topologies for the arrangement of antennas in Multiple Input Multiple Output (MIMO) arrays;

FIG. 8D-H illustrate possible alternative topologies for asymmetric arrangements of antennas in Multiple Input Multiple Output (MIMO) arrays;

FIG. 8G illustrates the possible field of view of such an asymmetric arrangement;

FIG. 13A shows a possible linear array which may serve to guide the construction of a composite array in an array-of-array scheme; and FIG. 13B shows a possible composite array corresponding to the mother array of FIG. 13A.

DETAILED DESCRIPTION

Figure 1A:
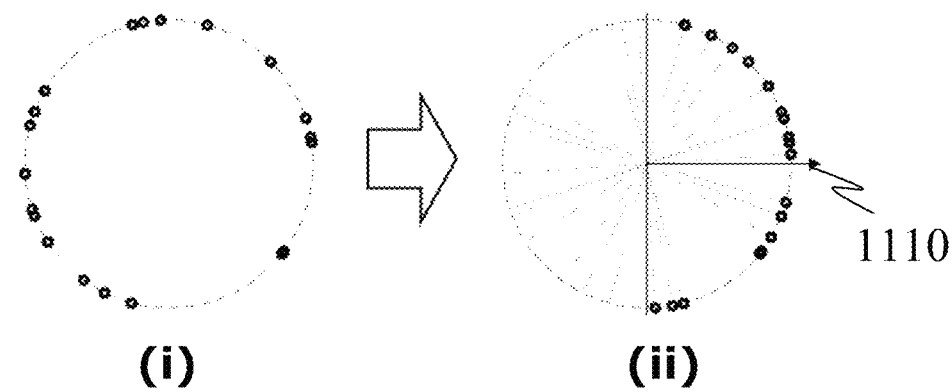
FIG. 1A illustrates how a steering vector may be generated by BPSK phase shifting of the phase of selected antennas by 0 or 180 degrees.

Aspects of the present disclosure relate to systems and methods for shaping the transmission beams produced by radar arrays. In particular systems and methods are described for reducing side lobes as well as increasing gain and phase linearity over super-hemispherical radar coverage.

In order to reduce side lobes, signals transmitted by each antenna of the array may be binary phase shifted according to a required temporal phase shift profile. Post processing methods may be applied to the received reflected signal over multiple time periods to simulate multiple phase shift beam forming such as quadrature phase-shift keying (QPSK) beam forming, for example. Typically, the receivers and transmitters may be synchronized in order to produce consistent results during the time interval on which the signals are combined.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Figure 1B:
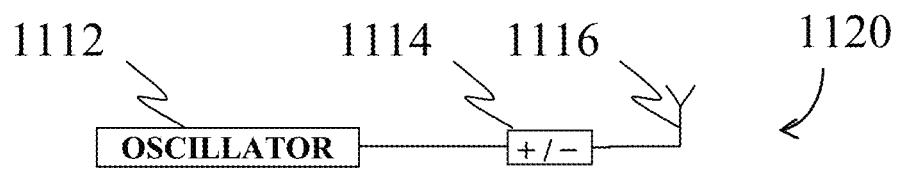
FIG. 1B illustrates a possible BPSK mechanism for phase shifting the signal to an antenna by 180 degrees.

Reference is now made to FIG. 1A and FIG. 1B. FIG. 1A shows how a steering vector may be generated by BPSK phase shifting. With no artificial phase shifting, an array of antennas may produce a range of phase shifts due to the nature of the electronic circuits and the like, plus the phases generated by wave propagation to a desired steering direction (termed "array factor"). This range of phases is represented in the circular range of FIG. 1A(i). The phasors shown in the figure do not add up coherently. By selectively adding a 180 degree phase shift to all the antennas producing phases within the left side of the circle, it is possible to partially align these phasors as shown in FIG. 1A(ii), and thus emit energy toward the desired steering direction. Accordingly, each antenna 1116 of the array may be connected to the signal generating oscillator 1112 via a binary phase shifter 1114, as shown in FIG. 1B. Although the BPSK mechanism may indeed generate a steering vector 1110, the resultant beam suffers significant side lobes and large losses.

Figure 1C:
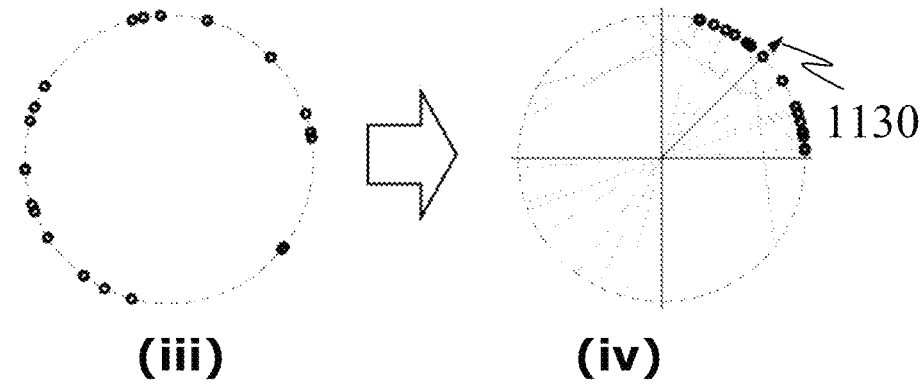
FIG. 1D illustrates a possible quadrature modulation mechanism for phase shifting the signal to an antenna by 0, 90, 180 or 270 degrees.
Figure 1D:
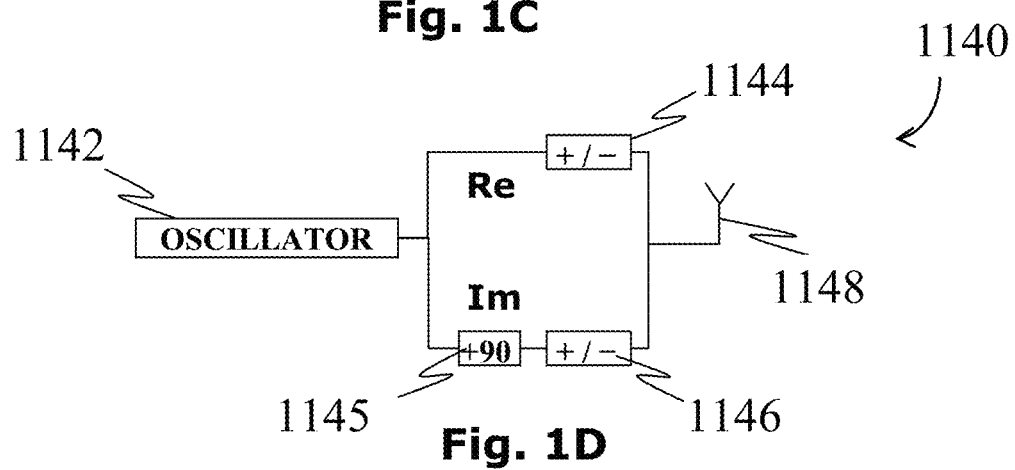

A more efficient steering vector may be generated by providing further phase shift options. Referring to FIGS. 1C and 1D, a range of phases such as shown in FIG. 1C(iii) may be converted into a net steering vector 1130 such as shown in FIG. 1C(iv) by selectively shifting each transmitted signal by 0, 90, 180 or 270 degrees as required (QPSK).

FIG. 1D illustrates a possible hardware arrangement 1140 for producing such phase shifts in an antenna 1148 of the array. Each antenna 1148 of the array may be connected to the signal generating oscillator 1142 via a phase shifting mechanism having two parallel arms an in-phase arm (Re), and a quadrature arm (Im).

The in-phase arm (Re) includes a first binary phase shifter 1144 which may be selectively activated to add a 180 degree phase shift to the oscillating signal as required. Alternatively, by not activating the first binary phase shifter the signal is transferred to the transmitting antenna in phase.

The quadrature arm (Im) includes a second binary phase shifter 1146 and a quarter cycle phase shifter 1145. The quarter cycle phase shifter 1145 is configured to add a 90 degree phase shift to the oscillating signal. Accordingly, if the second binary phase shifter 1146 is not activated a 90 degree phase shift is applied to the signal transferred to the antenna. Alternatively, if the second binary phase shifter is activated to add a further 180 degree phase shift, a total phase shift of 270 degree is applied to the signal transferred to the antenna as required.

It will be appreciated that such a hardware quadrature modulation mechanism such as shown in FIG. 1D may significantly improve the overall steering vector. However, the arrangement requires significantly more hardware elements than the simple binary phase shifter 1120 of FIG. 1B. The addition of a quadrature arm for each antenna, including a quarter cycle phase shifter which may need to be located physically close to the antenna itself, places significant hardware constraints on the architects of antenna array circuits.

A possible solution for generating improved steering vectors using only the binary phase shifter elements is described here.

Referring now to the block diagram of FIG. 2A, selected elements are represented of a first embodiment of a system for simulating quadrature phase-shift keying (QPSK) beam forming in an antenna array 1200. The system includes a transmitter 1250, an antenna array 1210, a binary phase shifter 1220 associated with each transmitting antenna, a controller 1230, a receiving antenna 1240; and a post processor 1260.

The transmitter 1250 is configured and operable to generate an oscillating signal for transmission by the antenna array 1210. It is noted, that where appropriate, the transmitter 1250 may be further operable to generate a signal sweeping through a range of frequencies, or a chirp.

The antenna array 1210 includes a number of antennas A1-n. Each antenna is operable to transmit the signal generated by the oscillator 1270 simultaneously with a required phase shift. It will be noted that the superposition of the transmitted signals from all the antennas in the array produces an overall signal beam having a characteristic shape.

The binary phase shifter 1220 associated with each transmitting antenna An is configured and operable to selectively apply a phase shift of 180 degrees to the oscillating signal as required. Alternatively, if the binary phase shifter 1220 is not activated, no phase shift is applied to the oscillating signal. Accordingly, the signal transmitted by the associated antenna is either in phase or in anti-phase with the oscillating signal produced by the oscillator 1270, as required.

The controller 1230 is configured to send activation instructions to the binary phase shifters 1220 such that only the required antennas transmit phase shifted signals.

The (one or more) receiving antenna 1240 is configured to receive return signals reflected from targets.

The post processor 1260 is operable to manipulate received signals and includes a memory 1280 element and a processing unit 1290. The memory element 1280 is operable to save received signals. The processing unit is operable to apply phase shifts to selected received signals stored in the memory 1280, and further operable to sum received signals stored in the memory 1280.

In particular examples, the processing unit may apply a 90 degree phase shift to selected received signals and to sum these with other received signals to produce a required output signal.

Accordingly, the controller may be operable to determine a required complex steering vector $C=R+jI$ for each antenna of the array. The complex steering vector C includes a binary real component R selected from +1 and −1 and a binary imaginary component I selected from +1 and −1. The value of +1 indicates that no phase shift is required and the component of −1 indicates that a phase shift is required. Thus the real component may represent a required phase shift selected from 0 and 180 degrees and an imaginary the component may represent a required phase shift selected from 90 and 270 degrees, all with reference to the R=+1, I=+1 combination.

Referring now to the graphs of FIG. 2B which indicate a possible set of profiles showing an example of how the phase of the transmitted signal S1-$n$ from each transmitter antenna A1-n of the first embodiment may change over time.

It is noted that the phase shift of each antenna remains fixed for a given time interval Δt. Each antenna An receives a unique profile determined by the required steering vector Ci at that time. Each complex steering vector Ci may determine the required phase shifts for two consecutive time intervals Δti, Δti+1.

During a first time interval Li, the controller instructs binary phase shifters 1220 of antennas A1-n having an associated steering vector Ci with a real component Ri of −1 to apply a 180 degree phase shift to the transmitted signal.

During a second time interval Δti+1, the controller instructs binary phase shifters 1220 of antennas having an associated steering vector Ci with an imaginary I component of −1 to apply a 180 degree phase shift to the transmitted signal.

Accordingly, the post processor 1260 may be operable to store reflected signals received during the first time interval and the second time interval in the memory. The processor unit may then apply a 90 degree phase shift to signals received during the second time interval before summing the signals received during the first time interval to 90 degree phase shifted signals received during the second time interval.

The resulting output signal from the post processor will have the characteristics of a quadrature phase shifted signal.

Figure 2C:
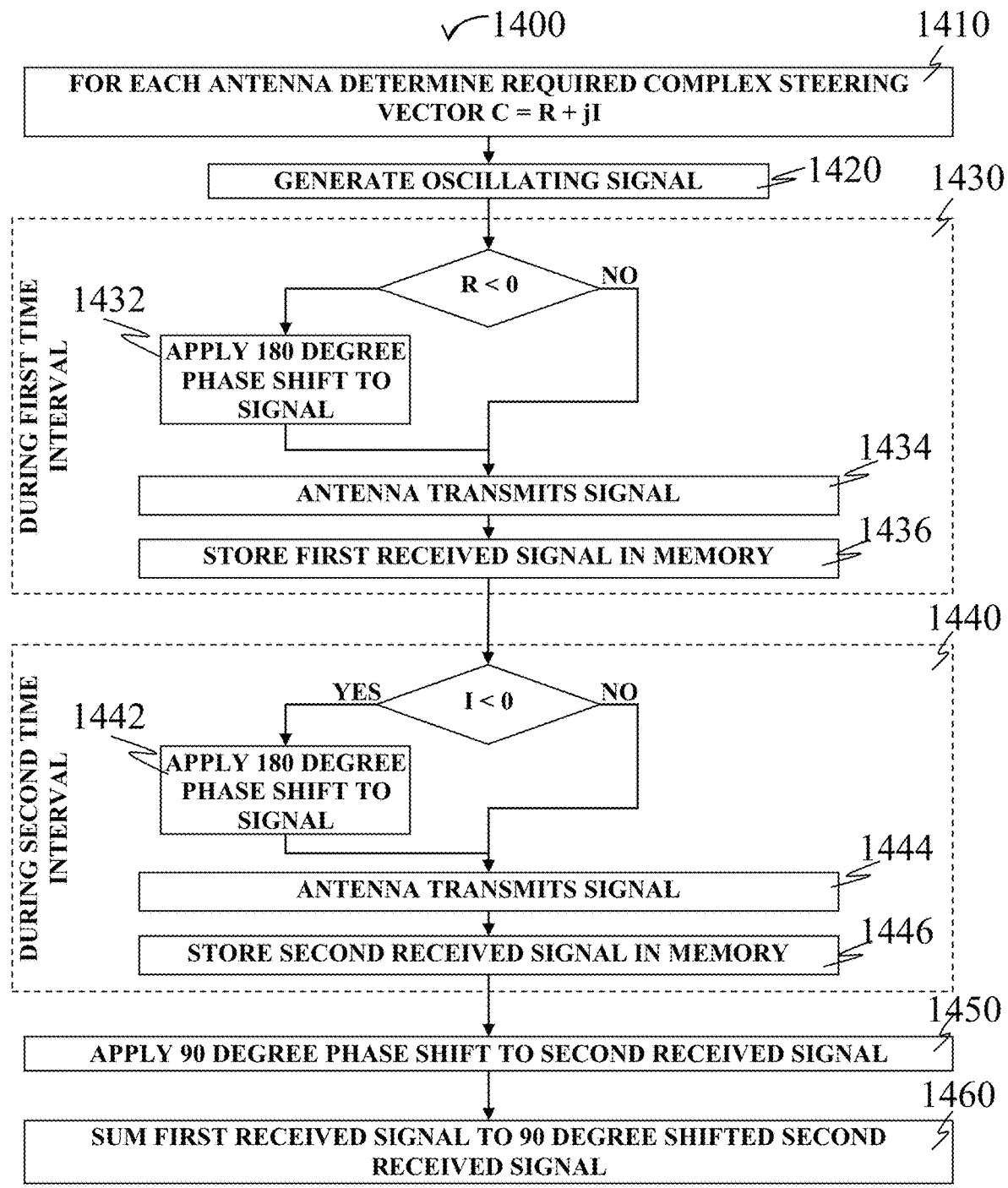
FIG. 2C is a flowchart indicating selected steps in a method for simulating quadrature phase-shift keying (QPSK) beam forming with the system of the first embodiment.

Referring now to the flowchart of FIG. 2C, selected steps are indicated of a method 1400 for simulating quadrature phase-shift keying (QPSK) beam forming with the system of FIG. 2A in which the antennas of the array 1210 are each connected to a common transmitter via a binary phase shifter 1220.

For each transmitting antenna of the array a required complex QPSK steering vector C is determined 1410 comprising a real component R selected from +1 and −1 and a binary imaginary component I selected from +1 and −1.

The transmitter generates an oscillating signal 1420 which is passed to each antenna via the binary phase shifter. Optionally, each transmitted signal may sweep over a range of frequencies during each time interval.

During a first time interval 1430, for each transmitting antenna having an associated steering vector with a real component R of +1, the associated binary phase shifter applies a 180 degree phase shift to the transmitted signal 1432, the antenna transmits the signal 1434 and the received signal is stored in the memory of the postprocessor 1436.

During a second time interval 1440, for each transmitting antenna having an associated steering vector with an imaginary component I of +1, the associated binary phase shifter applies a 180 degree phase shift to the transmitted signal 1442, the antenna transmits the signal 1444 and the received signal is stored in the memory of the postprocessor 1446.

The post processor may then apply a 90 degree phase shift to signals received 1450 during the second time interval 1440 and sum the signals received during the first time interval to 90 degree phase shifted signals received during the second time interval 1460.

A particular feature of the systems and methods described herein is the linear combination of the received signal over several time intervals in order to simulate and benefit from the advantages of an enhanced beamformer in a simulated manner. This feature can be extended in various forms which will be clear to those skilled in the art and are mentioned here as examples.

In one extension where the transmitter already supports beamforming using a certain choice of phases (e.g. 4 phases QPSK, 8 phases 8-PSK, etc), or gains, the combination of M codewords (two or more) over M time intervals can be used in order to generate a larger choice of phases by factor M (as for example, using 4 time intervals with BPSK or 2 time intervals with QPSK to generate simulated 8-PSK).

The simulated QPSK scheme can be alternatively described by taking a desired phasor C per transmit antenna, transmitting $X=Sgn(Re\{C \cdot e^{j\phi}\})$, where $\phi$ is 0 for the first interval and 90 degrees for the second interval, and then compensating for this phase in the received by multiplying with $e^{j\phi}$. In another extension of the current invention, the sequence of the "modulating" phase $\phi$ can be chosen in different ways over time, for example in different scanned frequencies or frames.

In another extension of the invention, the received signals over the M intervals are combined with arbitrary phasors $a_1, \ldots a_M$ not necessarily having unit gain (instead of $a_1=1$, $a_2=j$ for the case of QPSK as described herein). The beamforming codewords over these M intervals are chosen in a way that their linear combination weighted by $a_1, \ldots a_M$ yields desired characteristics (such as a high peak to sidelobe level).

The method described above for implementing QPSK (4 phases) beamforming by using binary phase shifters and two time-intervals is presented for illustrative purposes only. This method may be further generalized to implement any even number 2n of phases over n time-intervals. For example, with three time-intervals, a 6-PSK modulation may be achieved.

For N time intervals, a method may be implemented in which a transmitter applies a 180 degree phase shift selectively to particular antennas according to the following conditions. In the n-th time interval, a 180 degree phase shift is applied to the k-th antenna if the real value of the steering vector rotated by −n*180/N degrees is negative. Thus, for the k-th antenna a 180 degree phase shift is applied if the following formula is true:

$$Real(C_k^* e^{-j*\varphi[n]}) < 0,$$

where $C_k$ is the k-th component of the steering vector, and $\varphi_n = \pi n/N$ is the rotation sequence.

Accordingly, where appropriate, in the post-processor, a rotation of $\varphi_n$ radians maybe applied for the n-th time-interval, before summation of the received signal in all time intervals.

A method such as described herein may be extended to incorporate further criteria for the desired beamformer, by choosing a set of N phase shift sequences such that the mean of the transmitted signal over the N time intervals satisfies the desired criteria. For example, effective attenuation for a specific transmitter antenna may be required for gain control for apodization and transmitter gain equalization. This may be achieved, even without analog gain control, by using a specific rotation sequence for a specific transmit antenna, for example the steering vector for each antenna may be rotated by an angular step (1−a)*φn, say, where the value of a is selected specifically to suit each transmitter antenna).

The multiple time-intervals, needed for applying the described method, may further be used for other purposes. In one possible embodiment, multiple time-intervals may be used to allow Doppler processing within each Frame, in order to allow for an integration time that may be longer than the channel coherence time as well as for obtaining information regarding the velocity of targets. Each spatial transmitter direction to be scanned may include N time-intervals, and the Doppler post-processing may search for a linear phase shift between intervals that may correspond to a radial velocity. This may be implemented, for example using a Fast Fourier Transformation (FFT) over the time-intervals.

It is noted that, where appropriate, each time-interval may itself include sweeping the transmitted signal over multiple frequencies using a stepped frequency continuous wave, a Chirp or some other frequency function over time for the duration of the time-interval. Accordingly, by changing the beamformer between time-intervals as described above sidelobe levels would typically be reduced due to phase quantization at any given velocity. Nevertheless, the associated beamforming quantization errors may generate sidelobes at other velocities.

It is another feature of the current method that the spectral shape of the side lobes which are generated may be controlled by selecting a specific order for the time-intervals, such that most of the quantization noise which generates the sidelobes is limited to high frequencies, which correspond to radial velocities higher than those expected in the specific application. Where required, the phase rotation φn for the n-th time-interval (where n may take any integer value from 0 to N−1), may be selected such that:

$$\varphi_n = \pi * [(n*(N-1)/2) \bmod N],$$

where the "mod" is the modulo operation which returns the remainder of division by a given integer and it is assumed that N is an integer multiple of 4. As above, the 180 degrees rotation may be applied in the transmitter only if Real $(C_k^* e^{j*\varphi[n]}) < 0$, and the post-processor applies a rotation by $\varphi_n$. With such a reordering of the time-intervals, most of the sidelobes power resides at the Nyquist frequency of the Doppler.

In such applications where the higher level of sidelobes at Doppler Nyquist-frequency need to be avoided in a similar construction to the one mentioned above, the a-priori estimate of these sidelobes exact position in the 4D-space can be used to suppress and discriminate between an actual target and the method artifacts, without degrading significantly the radar dynamic-range. One such example may be filtering suspected 4D-voxel $\vec{r}_m$ having a Doppler-components $v_m$, which satisfy geometric constraints relative to 4D-voxel $\vec{r}_n$ and resides at an interval of several Doppler-resolution bins ($\delta v$) from its folded Doppler-component $-v_n$, namely—$\|v_m - v_n| - v_{max}\| \leq \delta v$.

It will be appreciated that other constructions may be used for selecting the order in the phase rotation sequence, or the sequence of steering vectors, so as to optimize the spectral shape of the quantization noise, as suit requirements.

In the construction above, a known required steering vector is rotated by $\varphi_n$ for the binary phase selection. An alternative approach, for example where the required steering vector is not known, may involve searching for the phase selection at the transmitter for which the value of Real(H($\{b_k\}$)*exp(j*$\varphi_n$)) is maximal, where H($\{b_k\}$) is the phasor representing the combination of all transmitting antennas in the desired spatial direction with a specific phase selection $b_k$. Such maximization can be performed in various ways for example by exhaustive search over all binary phase combinations (with K transmit antennas there are $2^K$ options). H may be obtained, for example, by analysis of direct measurements of electromagnetic waves reflected by a reference target located in a desired spatial direction.

The number of time-intervals may be selected so as to achieve the required beamforming accuracy in terms of, for example, sidelobes level, signal to noise ratio (SNR) (possibly using a longer integration time by adding intervals) and Doppler estimation resolution. On the other hand, the number of time intervals may be limited by other factors such as memory capacity and processing power of the electronic components, and avoidance of blur in the Frame. Accordingly, the actual number of time-intervals selected may be a compromise of all these considerations.

As some spatial directions might be more important than others, in terms of the needed SNR and Doppler resolution, it may be preferred that more time-intervals are allocated to those preferred directions, and fewer to other lower priority directions.

This scanning scheme may be used in various applications such as an exterior car radar sensor, used for ADAS (Advanced Driver Assistance System) or autonomous driving. In such an application, it will be appreciated that the horizontal angular range of interest (azimuth range) is typically wider than the vertical angular range of interest, (elevation range). This is because the car radar sensor is not generally required to scan beneath the road surface. Accordingly, it may be preferred to align the transmitter antennas in a vertical linear array such that the side lobes lie outside the high priority elevation range. The receiver antennas may be arranged in an orthogonally orientated horizontal linear array.

Other possible applications may include the monitoring of an enclosed space such as a room, a playing field, a goal-line or the like. Still other applications may involve the tracking of objects within a target region, possibly using large-arrays for body-scanning. Still other applications will occur to those skilled in the art.

Applying an acquisition scheme relying on beamforming may be particularly efficient in terms of constructing a 4D image with limited available processing and memory capacity, or alternatively increasing significantly the 4D-volume scanned and optimizing SNR. One such realization would be constructing an acquisition-processing pipeline, at which a specific angular-slice or solid-angle (beam [n]) out of [N] beams is being illuminated through beamforming, while processing the previous beam (n−1). This provides advantage to applications such as mentioned above, permitting usage of simpler processing-units, and reducing memory constraints and resulting thermal dissipation and product size.

Such an interleaved scheme can be extended to changing the acquisition profile per beam, permitting covering larger and more complex arenas, for example allocating few beams for short-range large field-of-view high-resolution and low-speed targets, and allocating other beams for long-range high-speed narrow field-of-view and limited resolution scenarios. The beams and profiles interleaving can be managed at any certain level, either within a single frame, or between each consecutive frames.

Figure 3B:
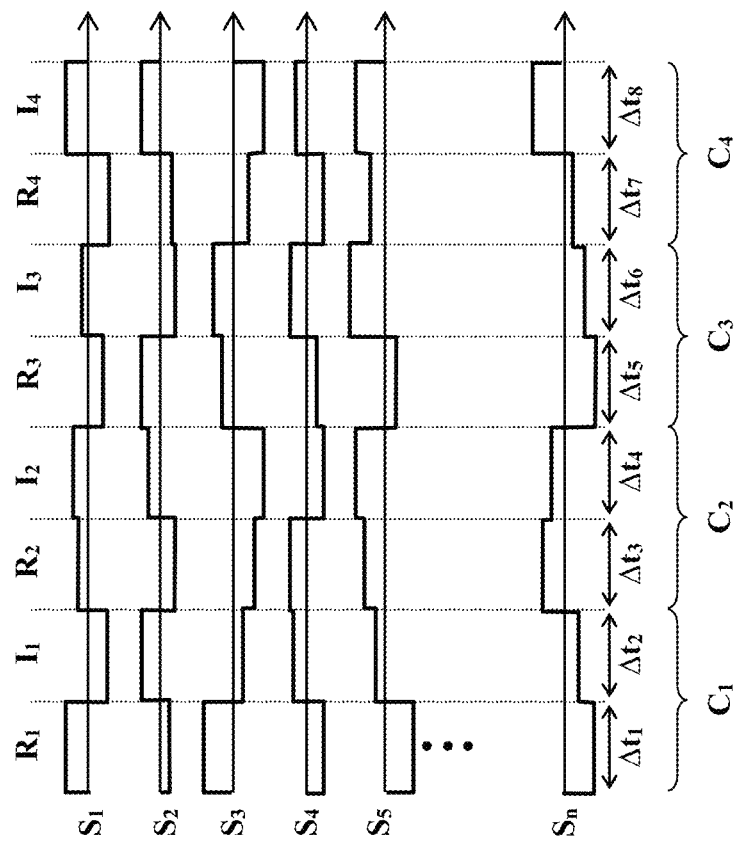
FIG. 3B are a set of graphs indicating a possible set of profiles showing an example of how the phase of the transmitted signal from each transmitter antenna of the second embodiment may change over time.
Figure 3A:
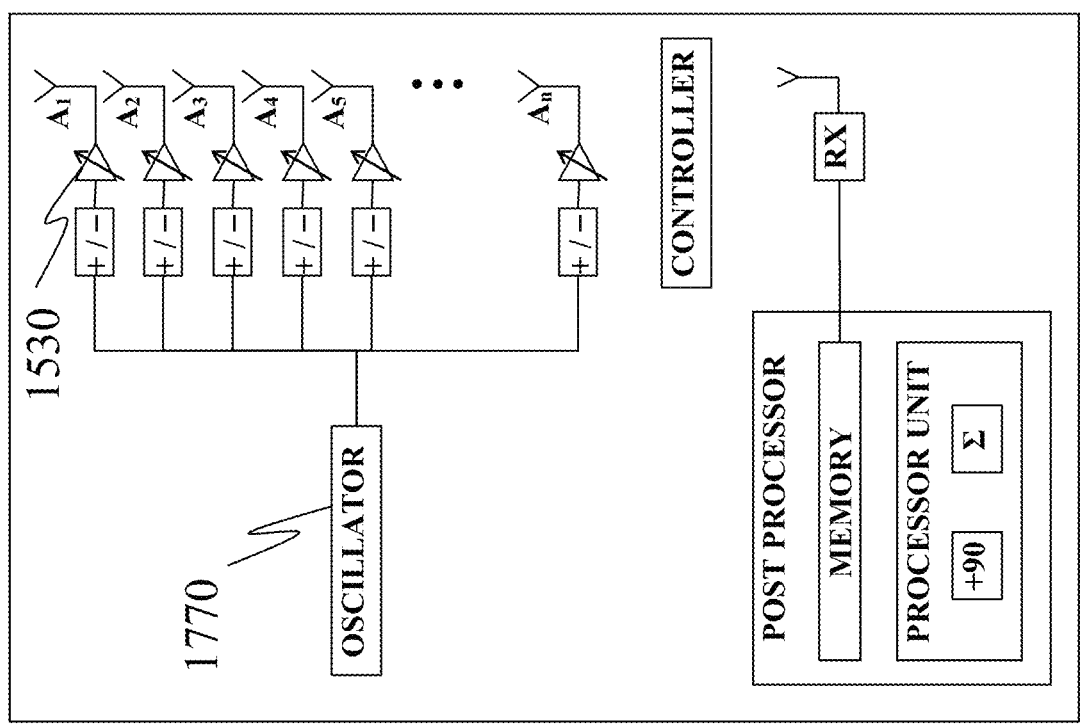
FIG. 3A is a block diagram schematically representing selected elements of a second embodiment of a system for simulating quadrature phase-shift keying (QPSK) beam forming in which each antenna is connected to gain control unit.

Referring now to the block diagram of FIG. 3A, which schematically represents selected elements of a second embodiment of a system in which each antenna is connected to gain control unit 1550 such that quadrature amplitude modulation (QAM) beam forming may be simulated.

In addition to the components shown in the first embodiment system of FIG. 2A, a dedicated gain control unit 1530 is associated with each transmitting antenna. Accordingly, the controller is further configured to instructions to the gain control units to amplify the transmitted signal by a required gain determined by the complex steering vector.

The controller may again be operable to determine a required complex steering vector C=R+jI for each antenna of the array. Here, however, the steering vectors may have a continuous real component R selected from the range +1>R>−1 and a continuous imaginary component I selected from the range +1>I>−1.

Accordingly, the controller may be further operable to select a required amplitude R for the real component of the associated steering vector and during the first time interval instruct the associated gain control unit to apply an associated first gain GR to the transmitted signal. Similarly the controller is operable to select a required amplitude I for the imaginary component of the associated steering vector and during the second time interval instruct the associated gain control unit to apply a second gain GI to the transmitted signal wherein the second gain GI is equal to the product of GR and the absolute ratio of I to R.

Referring to the set of graphs shown in FIG. 3B, the resulting signals produced by each antenna during each time period may thus be amplitude modulated as well as phase modulated.

Figure 3C:
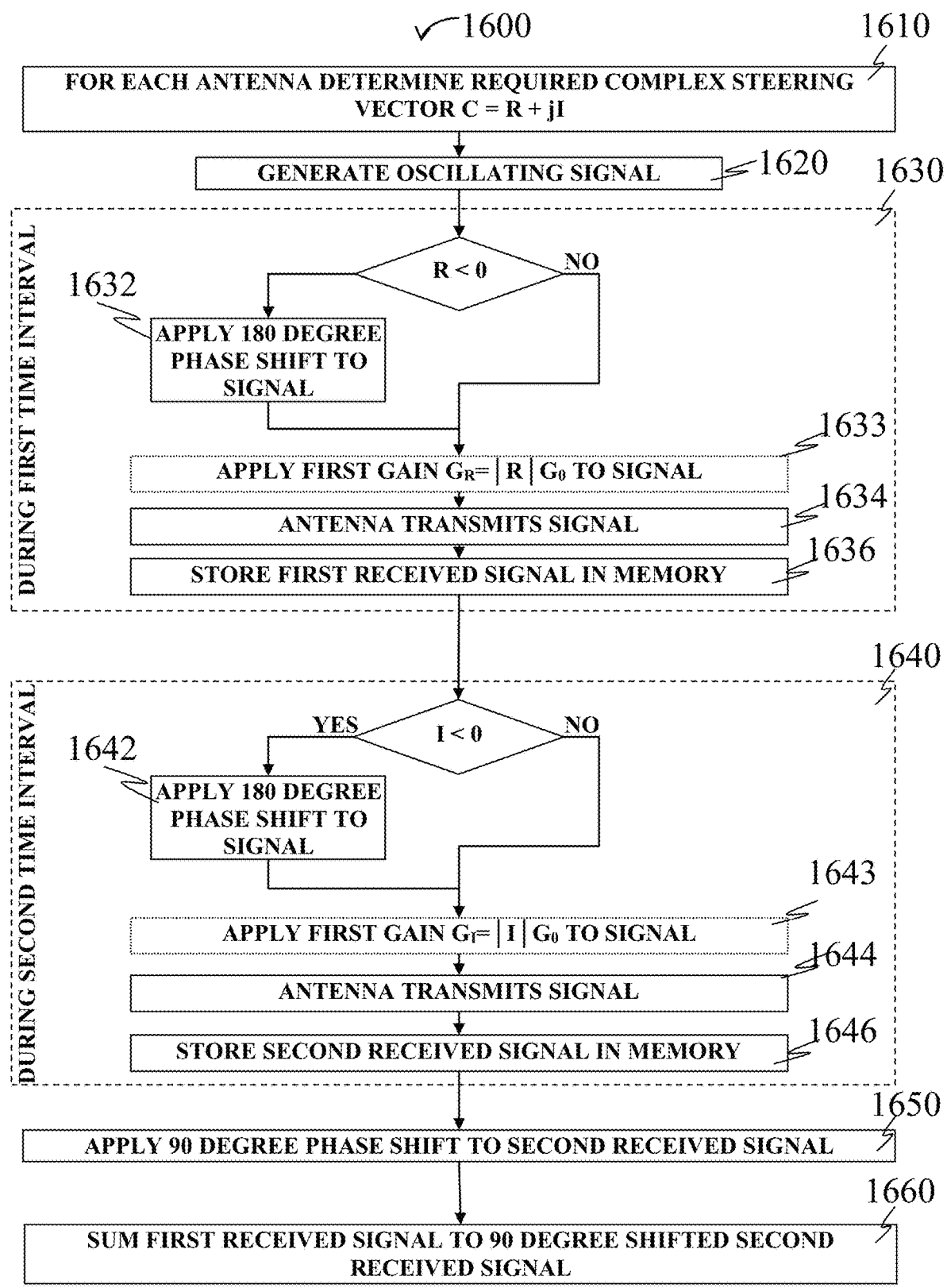
FIG. 3C is a flowchart indicating selected steps in a method for simulating quadrature phase-shift keying (QPSK) beam forming with the system of the second embodiment.

Referring now to the flowchart of FIG. 3C, selected steps are indicated of a method for simulating quadrature amplitude modulation (QAM) beam forming with the system of FIG. 3A in which the antennas of the array are each connected to a common transmitter via an associated binary phase shifter and a gain control unit 1530.

For each transmitting antenna of the array a required complex QPSK steering vector C is determined 1610 comprising a real component R selected from the range +1>R>−1 and an imaginary component I selected from the range +1>I>−1.

The transmitter generates an oscillating signal 1620 which is passed to each antenna via the binary phase shifter. Optionally, each transmitted signal may sweep over a range of frequencies during each time interval.

During a first time interval 1630, for each transmitting antenna having an associated steering vector with a negative real component R, the associated binary phase shifter applies a 180 degree phase shift to the transmitted signal 1632. The associated gain control unit amplifies the signal by a first value GR=|R|G0 1633, the antenna transmits the amplified signal 1634 and the received signal is stored in the memory of the postprocessor 1636.

During a second time interval 1640, for each transmitting antenna having an associated steering vector with a negative imaginary component I, the associated binary phase shifter applies a 180 degree phase shift to the transmitted signal 1642. The associated gain control unit amplifies the signal by a second value GI=|I|G0 1643 Then the antenna transmits the amplified signal 1644 and the received signal is again stored in the memory of the post-processor 1646.

Accordingly, when the post processor may applies a 90 degree phase shift 1650 to signals received during the second time 1640 interval and sums these signals 1660 with the signals received during the first time interval, the resultant signal may have a virtual phase shift of any value required.

It is further noted that although systems described herein include a dedicated binary phase shifter for each antenna, alternative systems may operate without phase shifters, by utilizing additional time intervals, as illustrated in FIG. 4A.

Using such a system may be enabled by activating only those antennas having a real component of +1 for a first time period without a phase shift, activating only those antennas having a real component of −1 for a second time period where a phase shift of 180 degrees is applied at the receiver, activating only those antennas having an imaginary component of +1 for a third time period without a phase shift, activating only those antennas having an imaginary component of −1 for a fourth time period and applying a phase shift of 180 degrees at the receiver.

It is further noted that provided that each antenna of a system has an independently controllable connecting switch 1740, such as illustrated in FIG. 4A, it may be possible to apply such phase shifts directly from the oscillator 1770 or during post processing. Additionally or alternatively, a common binary phase shifter may be connected to multiple transmitting antennas as required.

An example of the signal profiles produced by an example of such a system are presented in FIG. 4B. The post processor may store received signals from each of the first time period, the second time period, the third time period and the fourth time period in the memory.

The four signals may be summed by the receiver after applying a 0, 180, 90, 270 degree phase shift to the first, second, third and fourth step, respectively. By summing all these signals a simulated QPSK steering vector may be achieved in a system without phase shifters.

Still further extensions of the linear combination of a received signal over multiple time intervals will occur to those skilled in the art.

Referring now to the block diagram of FIG. 5, which schematically represents selected elements of a multiplexed embodiment of a system 500 in which each antenna $A_{1-5}$, $B_{1-5}$ is connected to gain control unit 530 including antenna dedicated amplifiers 532 and phase shifters 534.

It is further noted that, in the multiplexed embodiment system 500 the individual antennas are $A_{1-5}$, $B_{1-5}$ may be grouped into clusters 540A, 540B. Each cluster 540A, 540B may be connected to a phase-locked loop chirp oscillator (PLL) 510 via a dedicated cluster modulator 520A, where each antennar cluster is connected to the It will be appreciated that such a clustered system 500 may combine Frequency Modulated Continuous Wave transmission (FMCW) with Frequency Division Multiplexing (FDM) radar schemes. It is a feature of such embodiments that they may provide both beam forming as well as simultaneous transmission where required.

It is further noted that the theory of phased arrays provides that the spatial beam patterns are governed by a product of "element factor" and the "array factor". The "element factor" arises from the radiation pattern of a single antenna element, which is usually broad and illuminates a substantial portion of the space. The array factor stands for the sum over n elements of $e^{j\phi n} * e^{j r_n k_n}$, where $k_r$ is related to the spatial direction and to the wavelength, $r_n$ are the element locations, and $\phi_n$ are the phases of the signals applied to the antenna elements at locations $r_n$. It is well recognized that in the case of linear or planar arrays, the beam pattern of the array is related to the one dimensional or two dimensional Fourier transform.

Accordingly, phased array systems may be designed to maximize the power transmitted in a given direction, by selecting phases that will cause the transmission to add up coherently in that direction (hence the name "phased array"). In such case, N elements can create power accumulation by a factor of N squared ($N^2$) (rather than N), at the expense of other directions in space.

It is noted that in various situations it is beneficial to enjoy the increased the aggregate power of N transmitters, but to avoid coherent accumulation of the power in a given direction. By way of example, these include cases where it is required to limit the effective radiated power so as not to exceed safety thresholds, to avoid interference with other systems located anywhere in space, or to avoid exceeding regulatory thresholds of permitted EIRP.

It is therefore useful to design excitation phase combinations that will reduce, rather than increase, the maximum EIRP. In some cases, it is desired that a family of excitation phase sequences will meet this criterion.

A randomly chosen sequence is likely to avoid fully coherent accumulation, but is also likely to leave some "bright spots", as with laser speckle patterns. With large number of elements N and randomly selected phases, it is likely that the radiation in the strongest direction shall be approximately ln(N) times the average. Therefore, a more systematic approach is needed if tight control of maximum EIRP is desired.

The theory of sequences with low peak of their Fourier transform is well developed. As the power in the transform domain is similar to that in the original domain, this is sometimes called the Peak-to-Average Power Ratio (PAPR) problem. A domain where this theory was successfully applied is the field of Orthogonal Frequency Division Multiplexing (OFDM) modulation, where sequences in the frequency domain are converted to the time domain, and it is desirable to avoid large peaks for avoiding distortion in power amplifiers.

It is further noted that Low PAPR sequences may be used for peak EIRP reduction. The U.S. Pat. No. 7,483,367 (by N. Chayat et al), which is incorporated herein by reference in its entirety, describes constructing families of low-PAPR sequences for use as "preambles" in OFDM transmissions. The construction is based on "Complementary Sequences", invented by Marcel J. Golay in the 1940-s. The complementary sequences are pairs of sequences, the autocorrelations of which add up to a delta-function. Consequently, each of the sequences provably has a PAPR of at most 2 (3 dB). An introduction to the properties of complementary sequences can be found in U.S. Pat. No. 7,483,367 and the references therein all of which are incorporated herein by reference in their entirety.

Well known constructions allow generation of families of sequences on many lengths. A well-known "doubling construction" allows generating sequences of length $2^m$. If $A_n$ and $B_n$ are complementary sequences of length n, then $A_{2n}=[A_n \ B_n]$ and $B_{2n}=[A_n -B_n]$ are complementary sequences of length 2n. Therefore, if [1 1] and [1 -1] are complementary sequences of length 2, then [1 1 1 -1] and [1 1 -1 1] are complementary sequences of length 4, and [1 1 1 -1 1 1 -1 1] and [1 1 1 -1 -1 -1 1 -1] are complementary sequences of length 8.

The doubling construction for complementary sequences is closely related to Hadamard matrices and Hadamard codes. For example, if the rows of Hadamard matrix H[8*8] are:

1 1 1 1 1 1 1 1
1 -1 1 -1 1 -1 1 -1
1 1 -1 -1 1 1 -1 -1 1 1 1 1 1 1 1 1
1 -1 -1 1 1 -1 -1 1
1 1 1 1 1 1 1 1
1 -1 1 -1 1 -1 1 -1
1 1 -1 -1 1 1 -1 -1
1 -1 -1 1 1 -1 -1 1

Are multiplied with the complementary sequence [1 1 1 -1 1 1 -1 1], then in the resulting matrix C[8*8]:

1 1 1 -1 1 1 -1 1
1 -1 1 1 1 -1 -1 -1
1 1 1 -1 -1 -1 1 -1
1 -1 1 1 -1 1 1 1
1 1 -1 1 1 1 1 -1
1 -1 -1 -1 1 -1 1 1
1 1 -1 1 -1 -1 1 1
1 -1 -1 -1 -1 1 -1 -1

The rows are all complementary sequences, while maintaining the property of the original Hadamard matrix that the rows are orthogonal to each other. As a side note, this method of generating a family of complementary sequences relates to the CCK (complementary code keying) method used in 802.11b wireless LAN standard.

The sequences may be further extended into higher dimensions. Notably, the doubling construction of Golay has been found to allow the formation of two (or more) dimensional sequences, by concatenating the sub-arrays in dimension other than the original sequences. For example, the sequences [1 1] and [1 -1] can be used to form two 2*2 complementary arrays:

1 1
1 -1 and:

1 1
-1 1 are complementary 2*2 arrays. Staggering the sequences by arbitrary direction vector is possible, for example to form the complementary 2D patterns:

1 1 0
0 1 -1 and:

1 1 0
0 -1 1 or alternatively:

1 1 0
0 0 0
0 1 -1 and 1 1 0
0 0 0
0 -1 1

Similarly, if A and B are complementary column vectors of length N, then [A B] and [A-B] are 2D complementary arrays of size N-by-2. Similarly, by vertically stacking row sequences A and B, complementary arrays of size 2-by-N are obtained.

It has been found that such complementary sequences may be applied to beamforming by applying phases to the signals transmitted from different elements according to a sequence with a low PAPR. The maximum EIRP in any direction may be limited accordingly to a small factor above the spatial average. Therefore, if 0/180 phases are applied according to a Golay complementary sequence, a peak-to-average EIRP factor of 2 at most is ensured.

In one application a MIMO radar transmits from multiple transmitter antenna elements and receives with multiple receive antenna elements. By measuring the responses between all transmit antennas to all receive antennas, processing continues to reconstruct the spatial distribution of scatterers. For measuring the responses it would be possible to transmit from one antenna at a time, but a more efficient (transmit power wise) method would be to transmit from multiple antennas simultaneously. By applying a phase to each transmit element and transmitting multiple phase combinations, it is possible now to resolve the responses from multiple elements by multiplying the sets of responses by a matrix inverse to the "beamforming matrix" composed of the multiple beamforming vectors.

If it is desired that all of the transmissions will avoid strong illumination of all of the spatial directions, then we need families of beamforming signature vectors that are preferably orthogonal to each other, and all having low PAPR property.

By using families such as the modified Hadamard matrix as illustrated above, we can have a set of beamforming signature sequences achieving this goal.

Figure 6A:
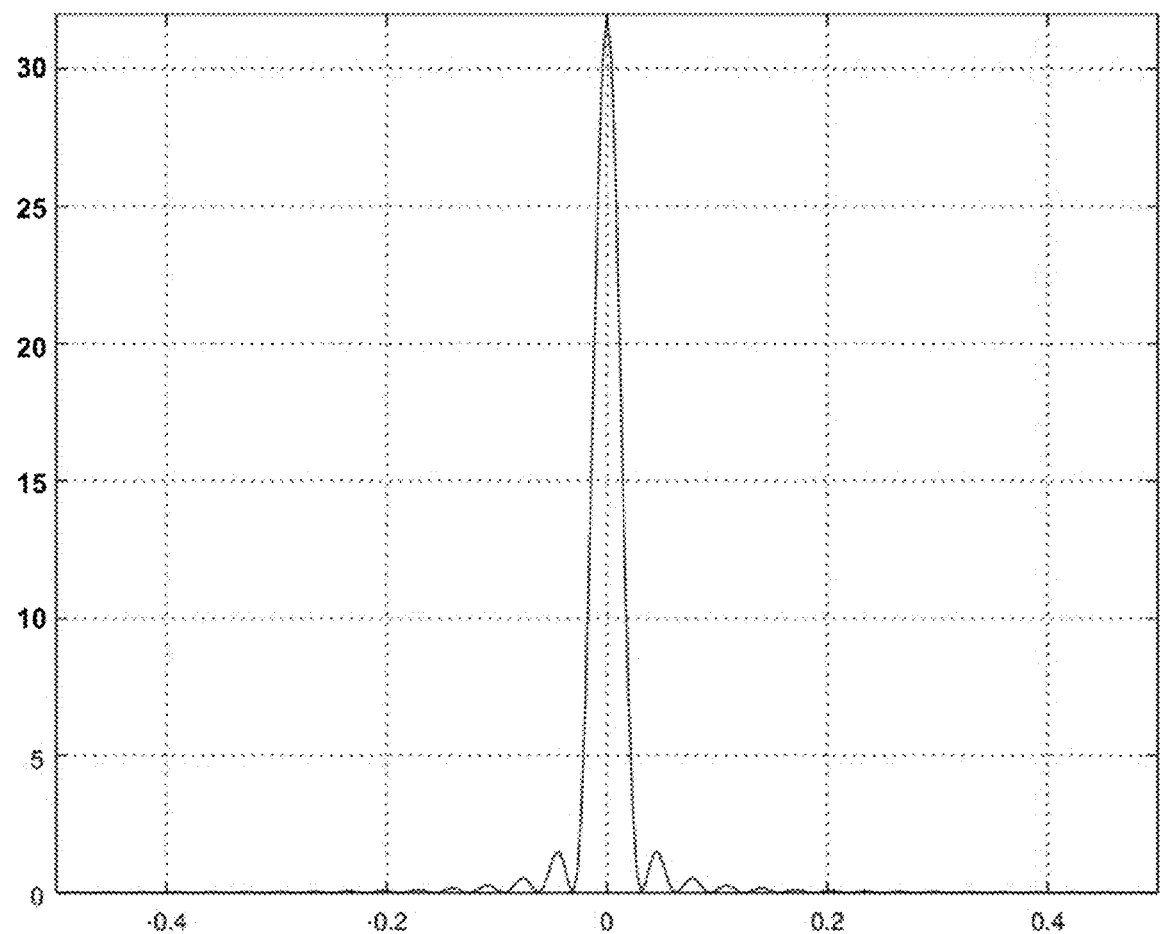
FIG. 6A is a graph indicating array power factor of a 32-element array with in-phase excitation.
Figure 6B:
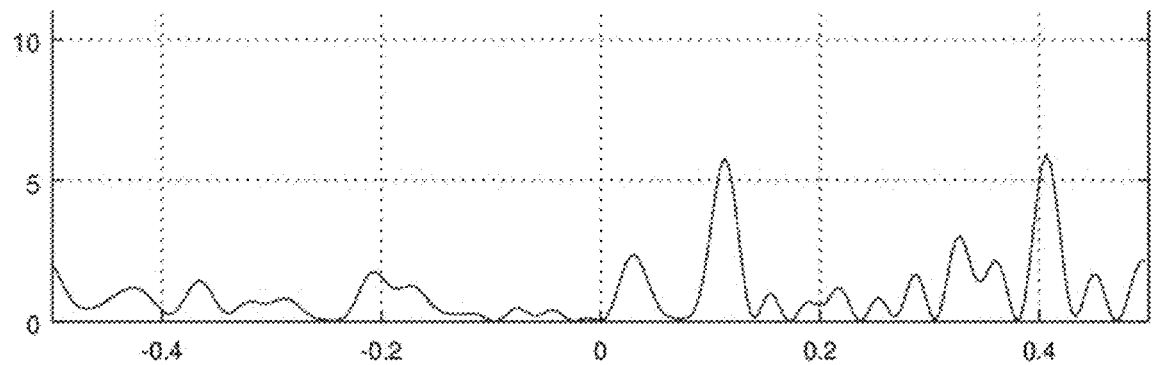
FIG. 6B is a graph indicating array power factor of a 32-element array with random phase excitation.
Figure 6C:
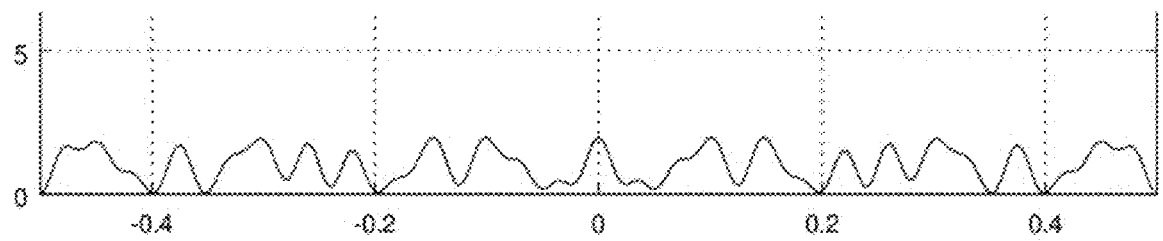
FIG. 6C is a graph indicating array power factor of a 32-element array with complementary sequence based excitation.

By way of example, the graph of FIG. 6A indicates array power factor of a 32-element array with in-phase excitation, this may be compared to FIGS. 6B and 6C which indicate array power factor of a 32-element array with random phase excitation and complementary sequence based excitation which have a much lower peak value.

In some cases, this goal can be approximated under practical constraints. One such case is when transmission lines between the transceivers and antenna elements have an additional phase shifts, which needs to be compensated by the phase shifters. In such case, if phase shifting is allowed with a limited resolution (e.g. two, four or eight phases), then the optimal set of phases can be quantized to the nearest realizable value. In such case the goal of having low PAPR is achieved in a non-optimal manner, but yet with substantially better performance than randomly chosen signature sequences. For example, the PAPR under practical constrains may be designed to not exceed a factor of three (5 dB) or four (6 dB), rather than the theoretical limit of two (3 dB) for complementary sequences.

In other cases the sequences can be optimized numerically. For example, in the art of OFDM modulation, techniques are known for "PAPR reduction" by starting with modifying a small subset of phases to substantially reduce the PAPR. The procedure can be iterated several times until the PAPR goal is met.

Any family of sequences or individual sequences with low-PAPR property can be used for the purpose of peak EIRP reduction, with complementary sequences being just a specific example. Other examples are CAZAC (constant amplitude zero auto-correlation) sequences, Zadoff-Chu sequences etc.

The above-mentioned property can be used for one-dimensional, two dimensional, or sparse array geometries, as long as the low-PAPR property of the sequence, with nonzero values at the specified locations, is met. An example of specific interest is two parallel columns (or rows) of elements. Such configuration is encountered in "frame" MIMO arrays or in "Pi-shape" MIMO arrays. In such case, if A and B are complementary sequences, then phasing one column of elements according to sequence A and the other column of elements according to sequence B results in a two-dimensional complementary sequence having low-PAPR property.

In the case of sparse array geometry, the excitation phases of which are designed to achieve a low-PAPR property, further sets of excitations phases may be formed by applying an additional 2D spatial progressive-phase pattern to the excitations. Applying progressive-phase pattern is equivalent to an angular shift of the low-PAPR beamshape, maintaining thus its low-PAPR property. This allows generation of an arbitrary number of low-PAPR patters, as needed for the radar spatial image reconstruction.

Figure 7A:
FIG. 7A illustrates a possible transmit antenna array.
Figure 7B:
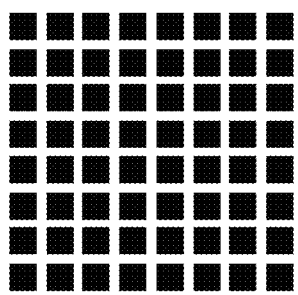
FIG. 7B illustrates a possible square transmit antenna array.
Figure 7C:
FIG. 7C illustrates a possible two-column transmit antenna array.
Figure 7D:
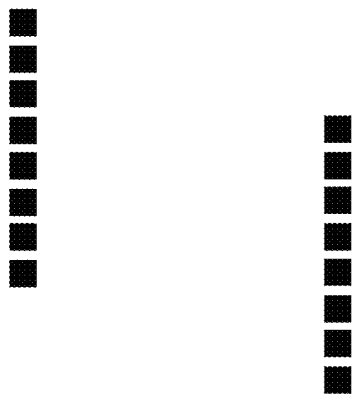
FIG. 7D illustrates a possible staggered two-column antenna array.
Figure 7E:
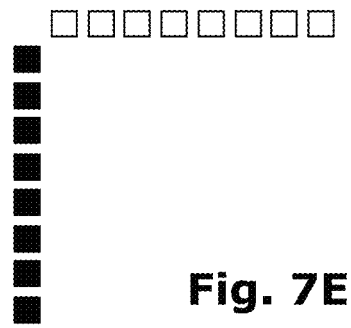
FIG. 7E illustrates a possible L-shaped MIMO antenna array.
Figure 7F:
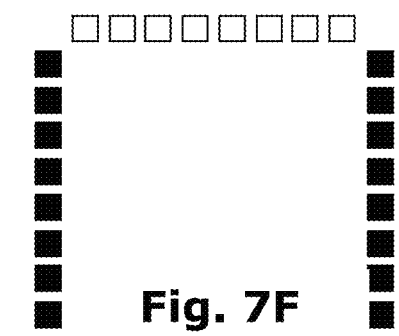
FIG. 7F illustrates a possible Pi-shaped MIMO antenna array.
Figure 7G:
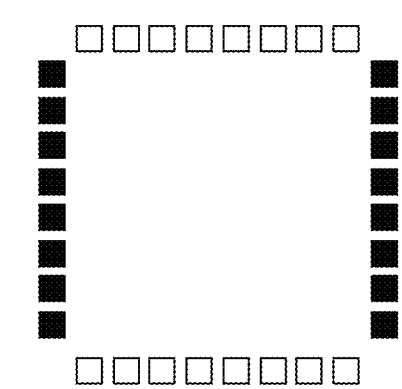
FIG. 7G illustrates a possible frame-shaped MIMO antenna array.
Figure 7H:
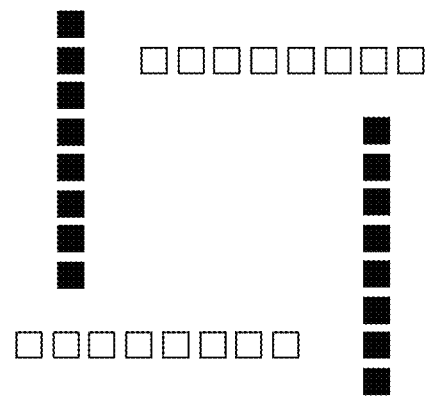
FIG. 7H illustrates a possible split-frame MIMO antenna array.

Various combinations of transmitter and receiver arrays may be used such as indicated in FIGS. 7A-H in which FIG. 7A illustrates a possible transmit linear antenna array; FIG. 7B illustrates a possible square transmit antenna array; FIG. 7C illustrates a possible two-column transmit antenna array; FIG. 7D illustrates a possible staggered two-column antenna array; FIG. 7E illustrates a possible L-shaped MIMO antenna array; FIG. 7F illustrates a possible Pi-shaped MIMO antenna array; FIG. 7G illustrates a possible frame-shaped MIMO antenna array; and FIG. 7H illustrates a possible split-frame MIMO antenna array.

Referring to FIGS. 8A-C, some array topologies include an L-shape array 800A, a Pi-shape 800B and a frame-array 800C. Such topologies may limit the possible attainable system-tradeoffs (such as angular resolution, field-of-view and signal to noise ratio).

It has surprisingly been found that more efficient utilization of MIMO and beam-formed arrays may be produced by combining L-shape and Pi-shape array topologies using antennas of different directivity-values. Such a novel array topology may use a combination of non-directional (wide-beam) and directional antennas over different edges of the array, permitting enhancement of the array performance, for example over selected sectors of the arena.

Referring now to FIG. 8D, by way of example, one possible embodiment of a combined array is a first asymmetric array 800D. The asymmetric array may be produced by connecting a large number of transmitting ports to wide-beam antennas 812 along a first leg 810D of a Pi-shape array and a smaller number of transmitting ports to directional antennas 822 along a second leg 820D of the Pi-shape array.

With reference to FIG. 8G, it is noted that the asymmetric array 800D provide most of the high-SNR (signal to noise ratio) and high angular-resolution on the vertical axis of the L-shape array. This may produce a wide vertical field-of-view 842 and a narrow vertical field-of-view 848 while doubling the horizontal angular-resolution over a narrow slice 844 in the vertical field-of-view. Accordingly, an enhanced horizontal angular resolution is achieved in a central region 846 of the field-of-view The allocation of ports between directional and non-directional antennas can be derived from overall system requirements (SNR and resolution over different angular sectors).

In a non-limiting example, one possible method for obtaining a balanced response from the two asymmetrical branches 810, 820 is by choosing the beamwidth of the directional antennas to be approximately $$\Delta\theta \sim 180° \frac{N_d}{N_{nd}} \eta_1,$$

and antennas-spacing of $$\frac{\lambda}{2} \cdot \frac{N_{nd}}{N_d} \cdot \eta_2,$$

where $N_d$ is the number of directional antennas, and $N_{nd}$ is the number of wide-beam antennas, and $\eta_1$ and $\eta_2$ are realization factors.

Other possible embodiments of asymmetric arrays are represented in FIGS. 8E and 8F. With particular reference to FIG. 8E, in a staggered-branch array 800E the directional-antennas may be staggered over the vertical-axis. Such an arrangement may extend the field-of-view of the staggered branch 820E (grating-lobes rejection).

With particular reference to FIG. 8F, in a horizontally-extended array 800F of highly-directional antennas 820F may be extended over the horizontal axis for further enhancement of the horizontal-resolution.

Although only asymmetrical arrays of transmitters is illustrated here, it will be appreciated that still other embodiments may include similarly modified arrays of receiving antennas.

In addition, the gain and directivity of the receiving antennas and the transmitting antennas may be different, and adjusted to optimize system-performance. For example—in the first asymmetric array, slightly-directional antennas may be implemented for the receiving ports—which directivity is between the directional and the non-directional transmitting antennas—$D_{tx,dn} < D_{rx} < D_{tx,d}$.

A possible transmission-scheme over this topology may variously use a MIMO transmission, or analog-beamforming of the transmitting-antenna, and combine the two transmitting branches either by using time-domain multiplexing (TDM), orthogonal-coding (e.g. Hadamard encoding), frequency-domain multiplexing (FDM, e.g. using different RF frequency per branch) or other methods as required.

With reference to FIG. 8H, where required multiple chips may be connected to the array for providing multiplexed clusters such as described above in relation to FIG. 5. Two vertical arrays of transmitters may each undergo beamforming with FDM used to multiplex the transmitted signal.

Figure 9A:
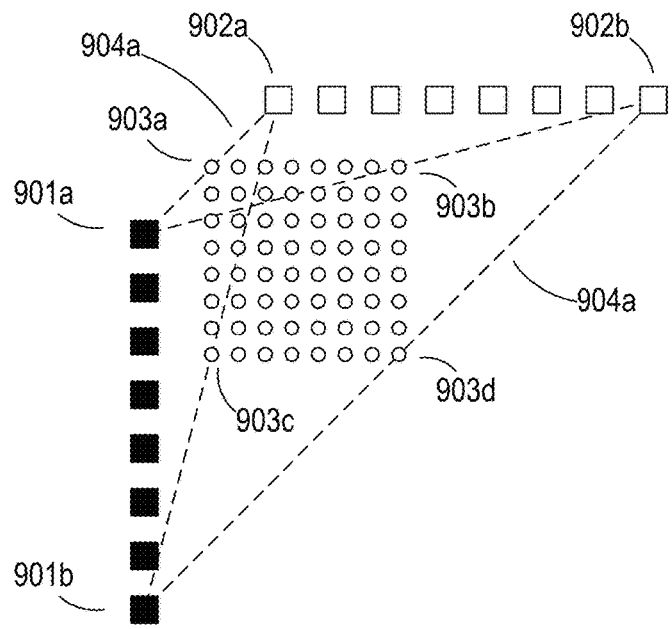
FIGS. 9A and 9B are schematic illustrations indicating how a virtual array is constructed comprising virtual elements at the midpoints between each pair of transmit antennas and receive antennas.

In the context of MIMO radar antenna systems, the concept of "virtual array" (VA) plays a key role. The signal to a target in a direction $\underline{n}$ from transmit antenna at location $r_T$ and back to receive antenna at location $r_R$ is proportional to $\exp(j*k_0*(n(r_T+r_R)))$, or equivalently $\exp(j*2*k_0*(\underline{n}*(r_T+r_R)/2))$, For a transmit array and a receive array with multiple antenna elements, the collection of all locations $(r_T+r_R)/2$ (mid-way between the transmit element and the receive element) is denoted as a VA of the combination of transmit and receive antenna arrays. This idea is exemplified in FIG. 9A. The linear equispaced transmit antenna array is composed from antennas 901a-901b (denoted by black squares), and the linear equispaced receive antenna array is composed from antennas 902a-902b (denoted by white squares). The VA of the two linear arrays is a square array of locations the corners of which are 903a-903d. The element 903a of the virtual array is mid-way along the line 904a that connects the transmit element 901a with receive element 902a. Similarly, the element 903d of the virtual array is mid-way along the line 904d that connects the transmit element 901b with receive element 902b; and so on. It is worth mention that having the virtual array situated on a uniformly-spaced grid facilitates efficient FFT-based MIMO radar signal processing algorithms.

Figure 9B:
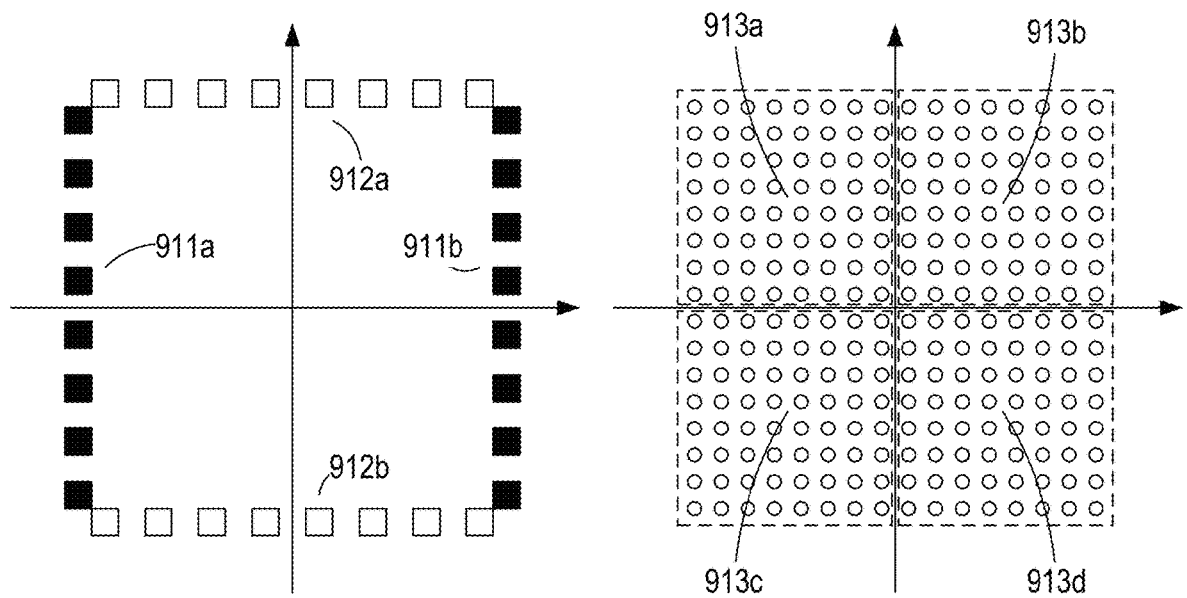

With reference to FIG. 9B, the idea is readily extended to arrays having multiple linear-segment subarrays, and in particular to "frame array" composed of two parallel linear transmit subarrays 911a and 911b, and two linear receive sub-arrays 912a and 912b. The square virtual array in this case is composed of four subarrays 913a-913d (each surrounded by a dashed line for clarity). The VA subarray 913a is compose of combination of antennas belonging to transmit subarray 911a and receive subarray 912a. Similarly, VA subarray 913b is a combination of 911b and 912a; 913c—of 911a and 912b, and 913d—of 911b and 912b. Achieving the relative location of the VA subarrays 913a-913d so that no voids are left may require locating the transmit subarrays 911a-b and receive subarrays 912a-b at locations such that the outermost transmit antennas are extremely close to outermost receive antennas. This proximity may be detrimental due to "blinding" of the receive antenna elements by the strong signals emanating from the adjacent strongly-coupled transmit antenna elements.

Figure 10A:
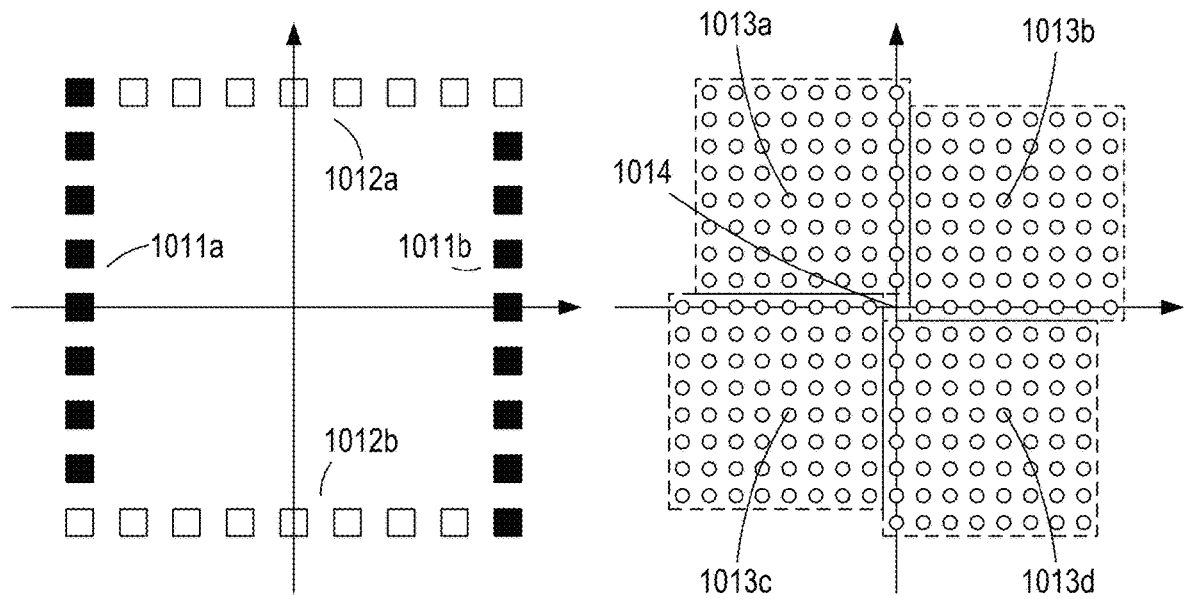
FIGS. 10A and 10B illustrate staggering the line segments in a frame array to obtain a contiguous virtual array with the exception of a central void.

The problem of strong coupling due to TX-RX element proximity is the topic of the set of solutions presented hereinunder. With reference to FIG. 10A, the "frame array" antenna element segments 1011a-b and 1012a-b are displaced so that the extreme TX and RX antenna elements are at a spacing no smaller that the distance between other antennas in the array. The resulting VA subarrays 1013a-1013d are displaced accordingly. The subarrays 1013a-d are still located on a uniform grid, but a void 1014 is created, at which no VA element is present. Incomplete VA gives rise to sidelobes during spatial processing. If this void is a small fraction of the VA array, the sidelobes incurred are low.

Figure 10B:
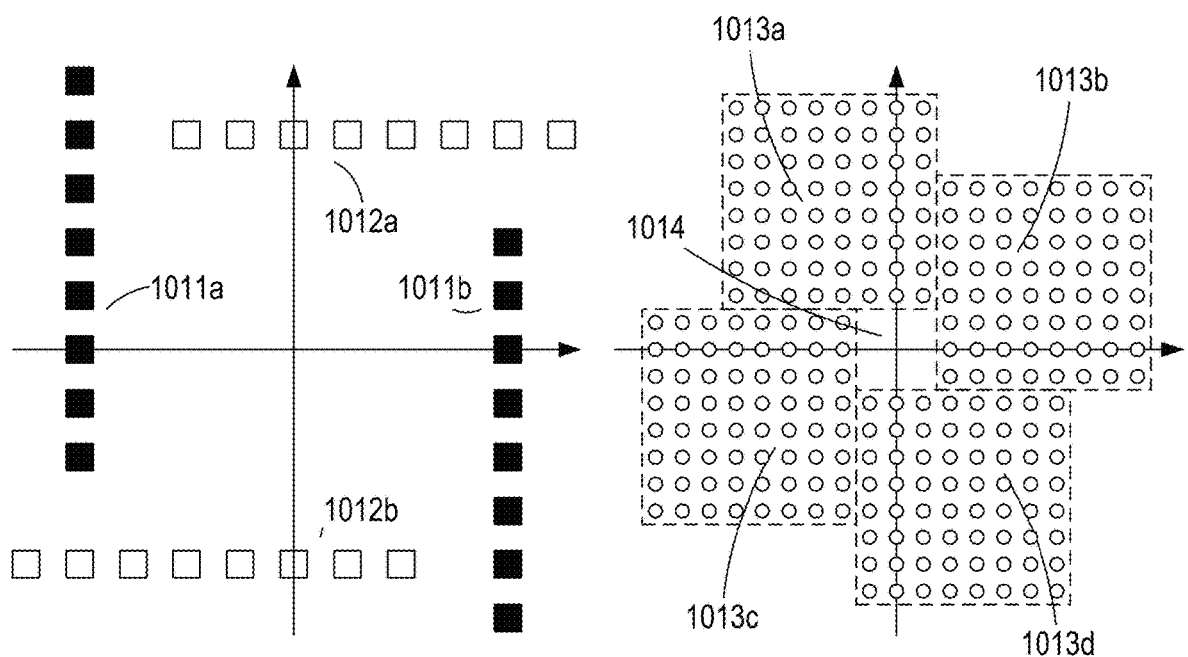

It could be desirable to space the TX and RX antenna elements even further. With reference to FIG. 10B, the "frame array" antenna element segments 1011a-b and 1012a-b are displaced even further, so that the extreme TX and RX antenna elements spacing is further increased. The square VA subarrays 1013a-d are still adjacent, but the void 1014 is increased to 9=3*3 missing elements in the center of the VA. This gives rise to further increase of spatial sidelobes. In the context of low-PAPR beamforming, it is worth noting that staggering the transmit subarrays still allows use of the 2D complementary sequences, as discussed above.

The irregular shape of the outer boundary of the VA typically has little effect, as its impact is reduced due to weighting (windowing) applied during the FFT-based processing to further reduce the sidelobes.

Figure 11A:
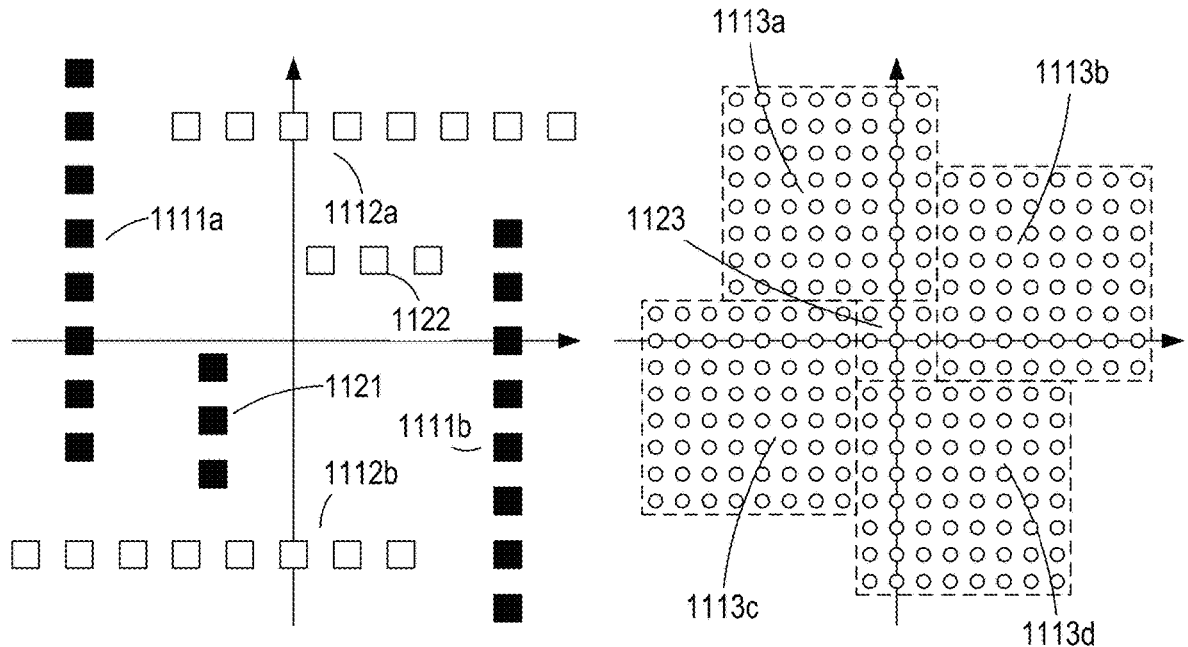
FIGS. 11A and 11B indicate how an auxiliary subarray may be used to fill the central void according to various embodiments.
Figure 11B:
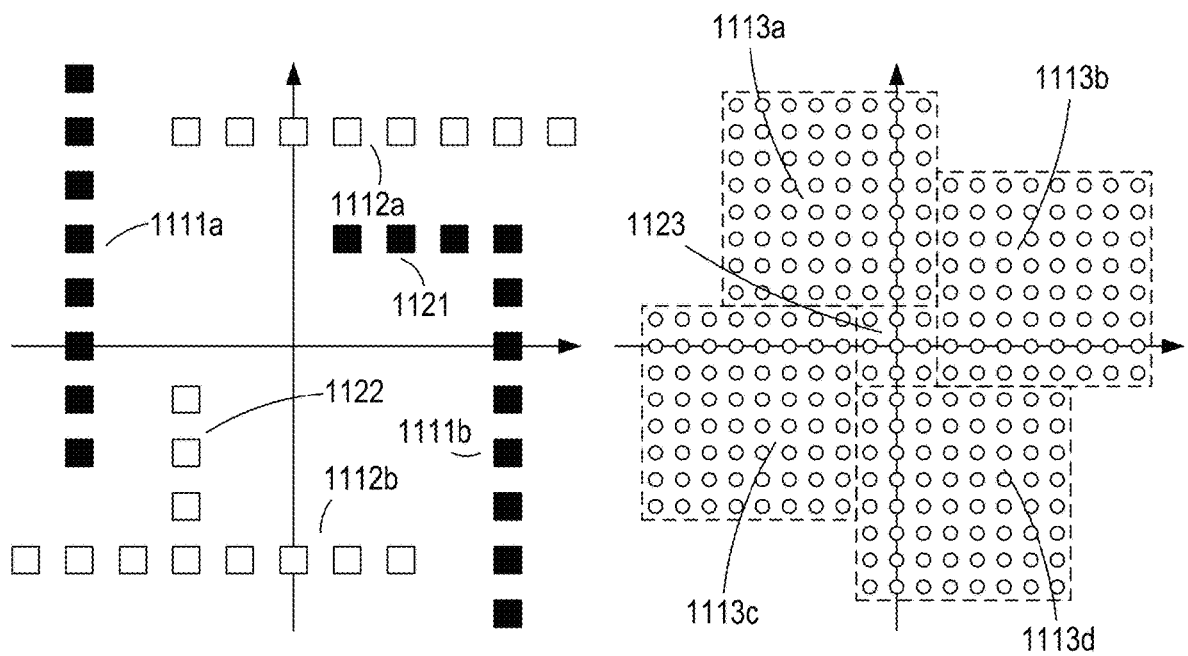

A solution to the problem of a void in the VA of the staggered frame is presented herein. With reference to FIGS. 11A and 11B, the solution is formed by adding auxiliary transmit and receive subarrays 1121 and 1122. In the example include three transmit antenna elements and three receive antenna elements which contribute a 3*3 virtual subarray 1123. This virtual subarray fills the void between the subarrays 1113a-d, creating a contiguous VA. Of course, this solution can be scaled to different amounts of stagger, to meet the limitation of the allowed TX-RX antenna spacing. FIGS. 11A and 11B illustrate two possible placements of the subarrays 1121 and 1122.

Figure 12A:
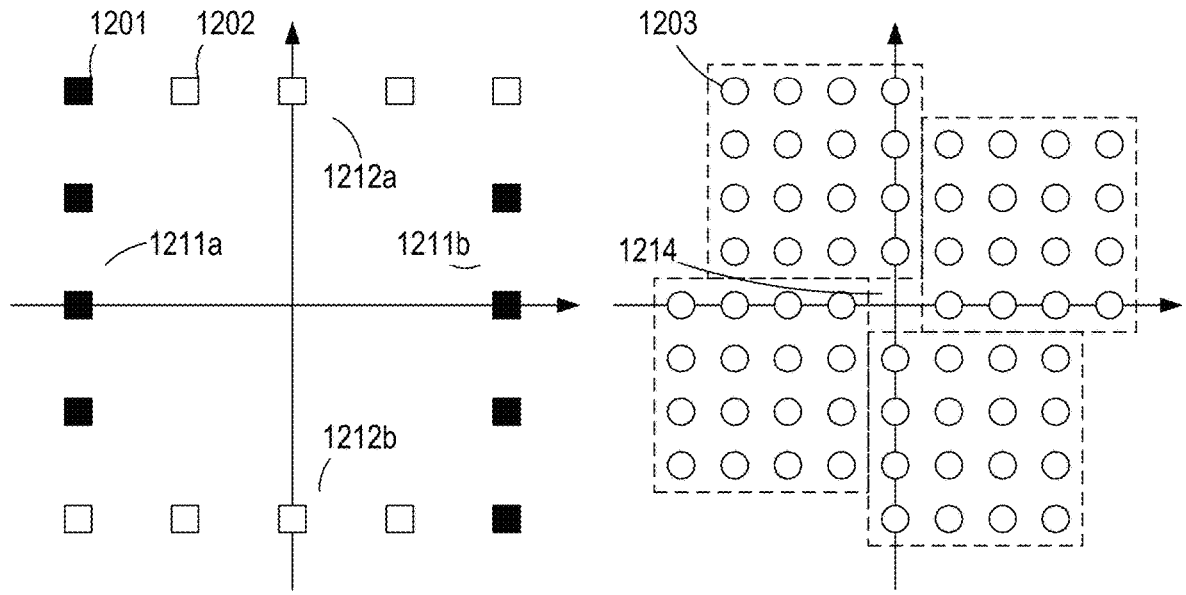
FIG. 12A shows an exemplary frame array which may serve as a mother array to guide the construction of a composite array in an array-of-array scheme.
Figure 12B:
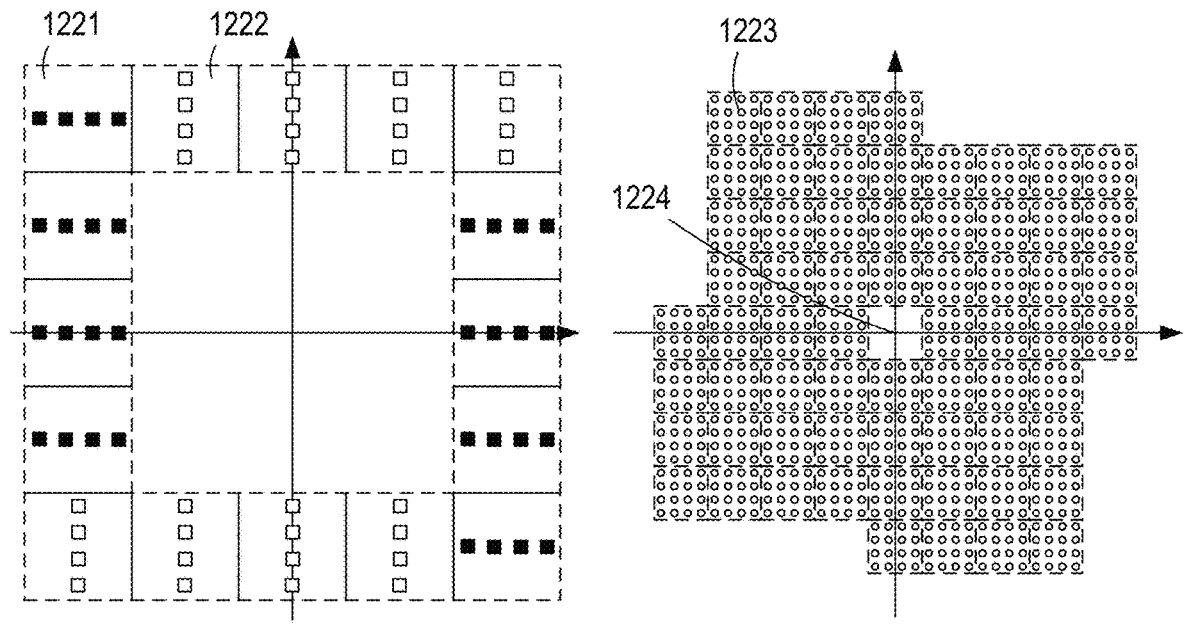
FIG. 12B shows a possible composite array corresponding to the mother array of FIG. 12A.

Further solution to the problem of proximity between TX and RX elements is presented in FIGS. 12A and 12B by way of example. The solution hinges on nested arrays or Kroneker-like, array-of-arrays hierarchical construction. FIG. 12A illustrates a "staggered-frame" construction, similar to the one shown in FIG. 10A, but with four antennas per linear segment. The "staggered-frame" of FIG. 12A serves as a mother array guiding the placement of elemental subarrays in an array-of-arrays scheme such as shown in FIG. 12B.

FIG. 12B shows a composite array in which each antenna location of the mother array of FIG. 12A is replaced by an elemental subarray, in this case a linear array of four closely packed antennas. In this example, each TX element, such as 1201, is replaced with an elemental subarray of four horizontally displaced elements. e.g. 1221; each RX element, such as 1202, is replaced with an elemental subarray of four vertically displaced elements. e.g. 1222. The resulting virtual array is composed of elemental clusters, each replacing an element in the original VA; for example, element 1203 of the original VA becomes a cluster 1223, which itself includes sixteen VA elements.

It is noted that in the example described above the original mother array of FIG. 12A VA had a void 1214 at its center, and as a result the VA of the corresponding hierarchically-constructed composite array has a void 1224 in its center as well. It will be appreciated that, by using a mother array having no central voids, such as exemplified in FIGS. 11A and 11B, the resulting composite array may have a corresponding contiguous VA with no central void.

It is further noted that the hierarchical construction well facilitates practical modular construction of large arrays. By way of example, a printed circuit module may be constructed with 24 antennas and corresponding ASICs, and this module is then used repeatedly to construct larger arrays. The interconnect between the modules may follow, for example, the techniques described in U.S. Pat. No. 10,020,836B2, U.S. Pat. No. 10,804,954B2 and related applications which are incorporated herein in their entirety.

The hierarchical construction technique further facilitates construction of large arrays, for example for the use in close-distance (so-called "near-field") MIMO radar imaging systems, such as security scanning systems. By way of example let us look at a one-dimensional "mother array" of six elements, which is used repeatedly. The repeating sequence is TTRTRR, where two transmitters followed by a single receiver are themselves followed by a single transmitter followed by two receivers. FIG. 13A illustrates such a one dimensional array, and of the corresponding one-dimensional VA formed by it. For each element in the VA (e.g. 1303), the lines show the TX (e.g. 1301) and RX (e.g. 1302) elements that participate in the formation of the VA element. Once the one-dimensional sequence is established, the large array is replaced by elemental "tiles" composed of linear segments, for example transit element 1301 is replaces with a tile of transmit elements 1311, and receive element 1302 is replaced with a tile of receive elements 1312. By assuring that a single transmit tile and a single receive tile have a complete VA, it is assured that the composite array has a complete VA as well.

It is further noted that the principles illustrated throughout the discussion above using square arrays are applicable to rectangular arrays having differing numbers of elements in the different directions of the 2D plane. FIG. 13B illustrates this principle, where the elemental elements have rectangular, rather than square, shape. Furthermore, the elemental subarrays of FIG. 13B illustrate that the number of transmit antennas need not be same as the number of receive antennas in an array or a subarray. This property has applications whenever it is desirable, for example, to shorten the time required to scan the transmitters or the transmit beam patters, or in the case that the cost of transmit elements is substantially higher that the cost of receive elements.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 7 to 4, from 7 to 6, from 3 to 6 etc., as well as individual numbers within that range, for example, 1, 7, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method for generating an antenna array transmission pattern having a spatial directional distribution of effective power characterized by a reduced Peak to Average Power Ratio (PAPR); the method comprising:
   providing an antenna array;
   providing at least one transmitter, each transmitter being connected to an antenna element of the antenna array;
   generating at least one excitation phase sequence wherein each element of the excitation phase sequence corresponds to a corresponding antenna element of the array;
   assigning excitation phase to said corresponding antenna element according to said element of the excitation phase sequence; and
   each antenna transmitting with the excitation phase determined by the excitation phase sequence;
   wherein the step of generating at least one excitation phase sequence includes selecting elements of the excitation phase sequence such that transmission from locations of the corresponding antenna elements provides a beam pattern characterized by having a spatial Fourier Transform with a reduced spatial PAPR.

2. The method of claim 1 wherein:
the step of providing an antenna array comprises providing an antenna array having N antenna elements, and
the step of generating at least one excitation phase sequence comprises generating an excitation phase sequence such that the spatial directional distribution of effective power is characterized by having a PAPR less than ln(N).

3. The method of claim 1 wherein the step of generating at least one excitation phase sequence comprises, generating an excitation phase sequence such that the spatial directional distribution of effective power is characterized by having a PAPR less than 3 dB.

4. The method of claim 1 wherein the step of generating at least one excitation phase sequence comprises, generating an excitation phase sequence such that the spatial directional distribution of effective power is characterized by having a PAPR less than 6 dB.

5. The method of claim 1 wherein the step of generating at least one excitation phase sequence comprises, generating an excitation phase sequence such that maximum Effective Isotropic Radiated Power (EIRP) of the spatial directional distribution is below a threshold.

6. The method of claim 1 wherein the step of providing an antenna array comprises providing a two-dimensional array and the step of generating at least one excitation phase sequence comprises generating a corresponding two-dimensional sequence and the Fourier transform is two-dimensional.

7. The method of claim 1 wherein the step of generating at least one excitation phase sequence comprises, generating an excitation phase sequence which provides a maximum Effective Isotropic Radiated Power (EIRP) of the spatial directional distribution which is below four times an average EIRP value of the distribution.

8. The method of claim 1 wherein the step of generating at least one excitation phase sequence comprises constructing a pair of complementary sequences having an autocorrelation which add to a delta-function.

9. The method of claim 1 wherein the step of generating at least one excitation phase sequence comprises generating a family of phase sequences.

10. The method of claim 9 wherein each phase sequence of the family of phase sequences is characterized by a reduced spatial PAPR.

11. The method of claim 1 wherein the step of generating at least one excitation phase sequence comprises generating an excitation phase sequence of power-of-two length $2^m$ where m is some positive integer, by constructing a family of phase sequences by:
generating a first pair of complementary sequences An and Bn of length n;
generating a second pair of complementary sequences A2n and B2n of length 2n, where A2n=[An Bn] and B2n=[An −Bn]; and
repeating such doubling until a sequence of length $2^m$ is obtained.

12. The method of claim 1 wherein the step of generating at least one excitation phase sequence comprises generating a family of phase sequences using complementary sequences, constant amplitude zero auto-correlation (CAZAC), generating Zadoff-Chu sequences or combinations thereof.

13. The method of claim 1 wherein:
the step of providing at least one transmitter comprises connecting multiple antenna elements to a common transmitter via a binary phase shifter; and
the step of each antenna transmitting with the excitation phase determined by the excitation phase sequence comprises generating at least one of binary phase-shift key (BPSK) or quadrature phase-shift key (QPSK) beam forming in the antenna array.

14. A system for generating an antenna array transmission pattern having a spatial directional distribution of effective power characterized by a reduced spatial Peak to Average Power Ratio (PAPR); the system comprising:
an antenna array;
at least one transmitter connected to each antenna element of the antenna array and operable to generate an oscillating signal;
at least one phase shifter associated with each antenna element of the antenna array;
a controller configured and operable to:
generate at least one excitation phase sequence wherein each element of the excitation phase sequence corresponds to a corresponding antenna element of the array wherein the elements of the excitation phase sequence are selected such that transmission from locations of the corresponding antenna elements provides a beam pattern characterized by having a Fourier Transform with a reduced spatial PAPR;
assign excitation phase to said corresponding antenna element according to said element of the excitation phase sequence; and
apply to each array element an excitation phase determined by the excitation phase sequence.

15. The system of claim 14 wherein the antenna array comprises a linear antenna array.

16. The system of claim 14 wherein the antenna array comprises a planar antenna array.

17. The system of claim 14 wherein the antenna array comprises a two dimensional antenna array.

18. The system of claim 14 wherein the antenna array comprises sparse antenna array.

19. The system of claim 14 wherein the antenna array comprises an array having two linear segments.

20. The system of claim 14 wherein the antenna array comprises a multiple-input-multiple-output (MIMO) antenna array.

* * * * *